United States Patent
Matsushima et al.

(10) Patent No.: US 9,130,411 B2
(45) Date of Patent: Sep. 8, 2015

(54) SMART METER, SUPPLY CONTROL METHOD, OPERATING METHOD, INTEGRATED CIRCUIT, SYSTEM, AND PROGRAM

(75) Inventors: Hideki Matsushima, Osaka (JP); Natsume Matsuzaki, Osaka (JP); Tomoyuki Haga, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 437 days.

(21) Appl. No.: 13/637,258

(22) PCT Filed: Jan. 27, 2012

(86) PCT No.: PCT/JP2012/000547
§ 371 (c)(1),
(2), (4) Date: Sep. 25, 2012

(87) PCT Pub. No.: WO2012/105210
PCT Pub. Date: Aug. 9, 2012

(65) Prior Publication Data
US 2013/0015716 A1    Jan. 17, 2013

(30) Foreign Application Priority Data
Feb. 4, 2011    (JP) .................................. 2011-022297

(51) Int. Cl.
*H02J 4/00*      (2006.01)
*H02J 13/00*     (2006.01)
*G01D 4/00*      (2006.01)

(52) U.S. Cl.
CPC ............ *H02J 13/0079* (2013.01); *G01D 4/004* (2013.01); *Y02B 90/242* (2013.01);
(Continued)

(58) Field of Classification Search
CPC .......................................................... H02J 4/00
See application file for complete search history.

(56) References Cited

U.S. PATENT DOCUMENTS

| 5,461,558 A   | * | 10/1995 | Patsiokas et al. ................ 700/16 |
| 2010/0010683 A1 | * | 1/2010  | Kates ............................ 700/293 |
| 2011/0309689 A1 | * | 12/2011 | Kamata ......................... 307/104 |

FOREIGN PATENT DOCUMENTS

| CN | 1395109 A    | 2/2003 |
| JP | 2001-283364  | 10/2001 |

(Continued)

OTHER PUBLICATIONS

International Search Report issued Apr. 17, 2012 in International (PCT) Application No. PCT/JP2012/000547.

(Continued)

*Primary Examiner* — Rexford Barnie
*Assistant Examiner* — Terrence Willoughby
(74) *Attorney, Agent, or Firm* — Wenderoth, Lind & Ponack, L.L.P.

(57) ABSTRACT

A smart meter includes: a power supply control unit which causes stoppage of a supply of power passing through the smart meter to an television and so on, when an RD command to stop the supply is received; a first communication unit which performs a first communication through which the RD command is received; a second communication unit which performs a second communication; and a communication control unit which: causes the performance of the first communication before the RD command is received; and prohibit the performance of the first communication and cause only the performance of the second communication, after the RD command is received.

17 Claims, 18 Drawing Sheets

(52) U.S. Cl.
CPC ............. *Y02B 90/244* (2013.01); *Y04S 20/322* (2013.01); *Y04S 20/327* (2013.01); *Y10T 307/696* (2015.04); *Y10T 307/944* (2015.04)

(56) References Cited

FOREIGN PATENT DOCUMENTS

| JP | 2003-143758 | 5/2003 |
|----|-------------|--------|
| JP | 2004-80919  | 3/2004 |
| JP | 2004-254459 | 9/2004 |
| JP | 2006-10095  | 1/2006 |
| JP | 2006-100952 | 4/2006 |
| JP | 2009-33880  | 2/2009 |
| JP | 2010-250508 | 11/2010 |

OTHER PUBLICATIONS

Rika Kasahara, "Scan Dispatch: Smart meters merely subsidy-motivated, vulnerabilities revealed one after another", Digest of the article for Scan subscriber members, ScanNetSecurity, Aug. 25, 2009, https://www.netsecurity.ne.jp/2__13857.html, with English translation.

Chinese Office Action and Search Report issued Feb. 12, 2015, in corresponding Chinese Application No. 201280001040.7 (with English translation of Search Report).

* cited by examiner

FIG. 6

| | | Remote command reception | Power source | Transmission to device | |
|---|---|---|---|---|---|
| Mode 1 | Normal mode | Possible | Power distribution network | Power distribution network | Compliant to various remote commands such as remote meter reading, etc. |
| Mode 2 | Emergency mode | Not possible | Power distribution network | Storage battery | Communicate only with internal registered devices; Driven by storage battery |
| Mode 3 | (Emergency mode 2) | Possible | Storage battery | Storage battery | Operating mode during an anomaly in power grid (Not used now) |
| Mode 4 | Recovery mode | Not possible | Power distribution network | Power distribution network | Mode immediately before restoration from emergency mode to normal mode; Command for transition to normal mode obtained from household appliance. |

FIG. 7

|  | 1 | 2 | 3 | 4 |
|---|---|---|---|---|
| Power grid | Yes | No | No | Yes |
| LAN | Yes | No | Yes | No |

65t

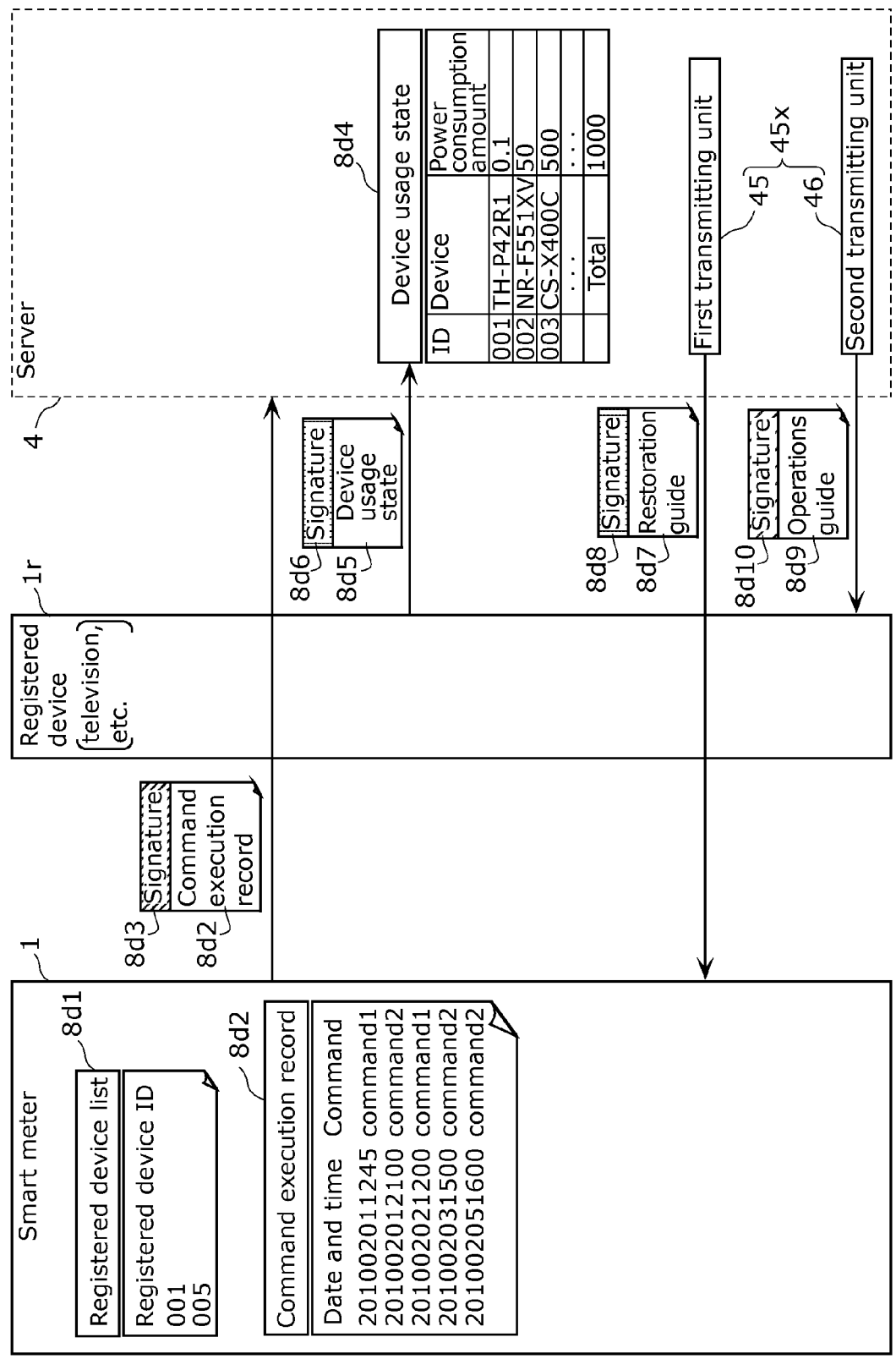

SMART METER, SUPPLY CONTROL METHOD, OPERATING METHOD, INTEGRATED CIRCUIT, SYSTEM, AND PROGRAM

TECHNICAL FIELD

The present invention relates to a smart meter which stops a supply of power passing through the smart meter to an electrical device, upon receiving a command to stop the supply.

BACKGROUND ART

Conventionally, electrical devices used at home, such as televisions, and so on, operate using power supplied from a power distribution board, and the power consumed is measured by a meter. Furthermore, in recent years, smart meters which allow remote meter reading have been put into use.

When a smart meter is used, power from a power grid (commercial power) is supplied to the power distribution board via the smart meter, and then supplied to electrical devices (an electrical device group composed of one or more electrical devices).

Many smart meters comply with remote disconnect (RD) commands. An RD command is a command which, when received by a smart meter, causes the smart meter to stop the supply of power to the electrical devices.

The RD command is, for example, transmitted from a server of a power company supplying the power via the power grid, to the smart meter via a network such as the Internet, and the like.

In addition, in recent years, it has been pointed out in Non-Patent Literature (NPL 1) and so on that there is the possibility for unauthorized transmission of RD commands by hackers and the like.

CITATION LIST

Patent Literature

[PTL 1] Japanese Unexamined Patent Application Publication No. 2003-143758
[PTL 2] Japanese Unexamined Patent Application Publication No. 2004-080919
[PTL 3] Japanese Unexamined Patent Application Publication No. 2004-254459

Non Patent Literature

[NPL 1] SCAN DISPATCH: Smart meters merely subsidy-motivated, vulnerabilities revealed one after another (http://www.netsecurity.ne.jp/2_13857.html)

SUMMARY OF INVENTION

However, it is difficult to completely prevent unauthorized RD commands from being received by a smart meter.

Furthermore, it is possible for communication by the smart meter to take place after an unauthorized RD command is received.

For example, it is possible that, after an unauthorized RD command is received, the smart meter carries out communication with the server of the power company, and so on, to investigate the RD command (see Sa4 in FIG. 8, and so on).

In addition, normally, there is a second communication which is less susceptible to use in unauthorized communication than a first communication performed prior to receiving the RD command.

Specifically, it is possible to have, as the second communication, communication via a predetermined device (see registered device 1r in FIG. 11, television 31 in FIG. 1, and so on), which is relatively less susceptible to use in unauthorized communication.

Furthermore, various forms of communication such as communication through a public phone network, and so on, are also assumed for the second communication.

As such, it is possible that, first communication, which is susceptible to use in unauthorized communication, is performed even after an unauthorized RD command is received through a first communication, and a hacker, and the like, may perform unauthorized communication and carry out a secondary attack.

For example, it is possible that a denial of service (DoS) attack, and the like may be performed as a secondary attack.

In view of this, the present invention has as an object to provide a smart meter capable of avoiding a secondary attack after an unauthorized RD command is received.

In order to solve the aforementioned problem, the smart meter according to the present invention is a smart meter including: a power supply control unit configured to cause stoppage of a supply of power passing through the smart meter to an electrical device when a command to stop the supply is received; a first communication unit configured to perform a first communication through which the command is received; a second communication unit configured to perform a second communication; and a communication control unit configured to: cause the performance of the first communication before the command is received; and prohibit the performance of the first communication and cause only the performance of the second communication, after the command is received.

It should be noted that, in this manner, the first communication is communication through which the command is received.

It should be noted that, for example, the first communication unit may be configured to perform communication through a first communication network, and the second communication unit may be configured to perform communication through a second communication network different from the first communication network.

Moreover, the second communication network may be a mobile phone network.

On the other hand, for example, the first communication unit may be configured to perform communication that does not pass through a predetermined device, and the second communication unit may be configured to perform communication which passes through the predetermined device.

It should be noted that, for example, the first communication may be blocked after the command is received.

Furthermore, for example, the first communication may be stopped after the command is received.

Specifically, the first communication is, for example, communication that is relatively susceptible to a secondary attack, such as a DoS attack, by a hacker, and the like, who causes an unauthorized command to be received. In addition, the second communication is communication and the like that is relatively insusceptible to a secondary attack such as a DoS attack.

In other words, for example, the first communication is communication using a first communication path that is not (sufficiently) safe. In addition, for example, the second communication is communication using a second communication path that is (sufficiently) safe.

Accordingly, after the command is received, first communication is not performed and the second communication is performed, and thus secondary attacks can be avoided.

It should be noted that the second communication may be, for example, communication with an electrical device identified by data such as an ID, and the like, that is registered in the smart meter, and may be communication that passes through such electrical device.

It is possible to avoid a secondary attack after a command (RD command, etc.) to stop supply of power is received.

By extension, appropriate operation can be carried out reliably, without secondary attacks, after the stop command is received.

Specifically, control which does not cause the stoppage may be performed in the case where, after a command is received, judgment is performed as to whether or not the received command is unauthorized, and it is judged that the command is unauthorized. Specifically, for example, this operation is reliably and appropriately performed, and inappropriate stoppage according to an unauthorized command is appropriately avoided. Inappropriate stoppage can be reliably avoided.

BRIEF DESCRIPTION OF DRAWINGS

FIG. 1 is a diagram showing a smart meter, and so on.
FIG. 2 is a diagram showing the smart meter, and so on.
FIG. 4 is a diagram showing the smart meter, and so on.
FIG. 6 is a diagram showing a table of modes.
FIG. 7 is a diagram showing a table of modes.
FIG. 11 is a diagram showing the smart meter, a registered device, and a server.

DETAILED DESCRIPTION OF INVENTION

Hereinafter, an embodiment of the present invention shall be described with reference to the Drawings. It should be noted that the embodiment described hereafter illustrates a preferred specific example of the present invention. The numerical values, shapes, materials, structural elements, the arrangement and connection of the structural elements, steps, the processing order of the steps etc. shown in the following embodiment are mere examples. Therefore, among the structural elements in the following embodiment, structural elements not recited in any one of the independent claims defining the most generic part of the inventive concept are not necessarily required to overcome conventional disadvantages, but are described as structural elements of a more preferable form.

Figure 1:
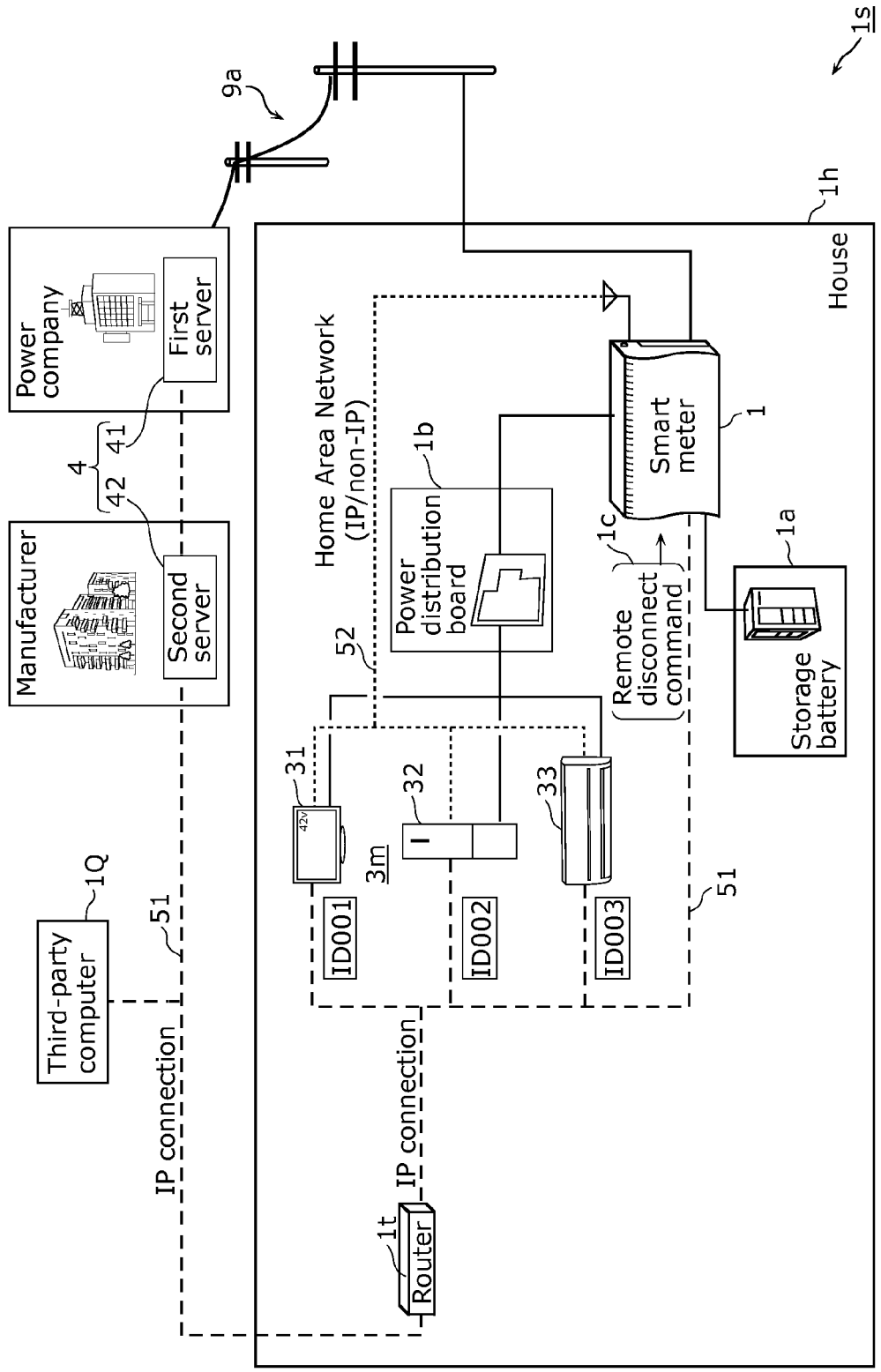

FIG. 1 is a diagram showing a smart meter 1, and so on.

A system 1s includes the smart meter 1, a television 31, a first server 41, and a second server 42.

It should be noted that the system 1s may further include a storage battery 1a, a router 1t, and so on.

The first server 41 and the second server 42 make up a server system (server) 4 which is formed by including the first server 41 and second server 42.

For example, the first server 41 is a server of a power company which supplies power from a power grid 9a through the smart meter 1.

In addition, the second server 42 is, for example, a server of the manufacturer of the television 31.

The smart meter 1 is provided in a house (home) 1h.

In addition, the smart meter 1 is an apparatus whereby the power (commercial power) from the power grid 9a is supplied to an electrical device group 3m, by passing through the smart meter 1.

The electrical device group 3m is composed of one or more electrical devices (the television 31, a refrigerator 32, an air conditioner 38, and so on) provided in the house 1h.

It should be noted that the supply of power to the electrical device group 3m is performed, for example, via a power distribution board 1b located between the electrical device group 3m and the smart meter 1.

In addition, the smart meter 1 detects the amount of power supplied to the electrical device group 3m.

Then, the smart meter 1 transmits the detected power amount through the Internet (first network 51).

The fee for the transmitted power amount is charged by the power company of the power grid 9a (see first server 41 of the power company) to the owner of the house 1h who is the other party to a contract with the power company.

For example, with this, easy and appropriate billing may be carried out without the need for a person such as a service staff of the power company to go to the house 1h.

Subsequently, the smart meter 1 receives (see Sa1 in FIG. 8, and so on, described later) a command (an RD command 1c, and the like).

The command to be received is, for example, a command to stop the supply of power, such as, for example, the remote disconnect (RD) command 1c, and the like.

When the RD command is and the like is received, the smart meter 1 stops the above-described supply of power passing through the smart meter 1.

The RD command 1c is, for example, transmitted to the smart meter 1 by the first server 41 of the power company when the power fee of the house 1h is unpaid.

Figure 2:
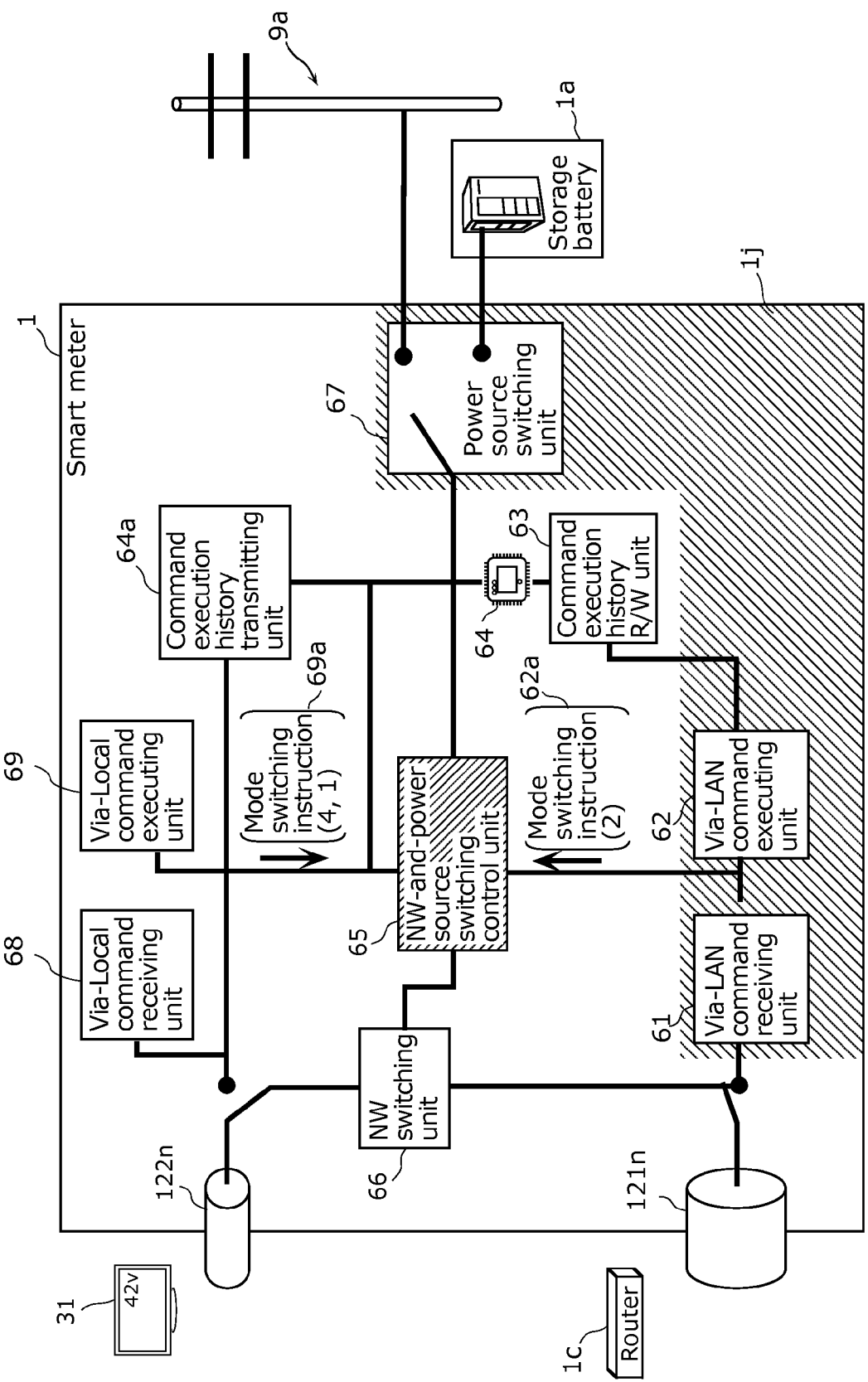

FIG. 2 is a diagram showing a configuration of the smart meter 1.

The smart meter 1 includes a via-Local Area Network (LAN) command receiving unit 61, a via-LAN command executing unit 62, a network (NW)-and-power source switching control unit 65, a NW switching unit 66, a power source switching unit 67, and a via-Local command receiving unit 68.

The via-LAN command receiving unit 61 performs a first communication (communication using the first communication unit 121 in FIG. 4 described later).

The first communication is communication performed through the first network 51 (FIG. 1).

It should be noted that the first network 51 is, for example, an IP network using the Internet Protocol (IP).

It should be noted that, for example, a first communication between the smart meter 1 and the outside (the server system 4, and so on) of the house 1*h* may be performed via the router 1*t* (FIG. 1).

In addition, as described earlier, the first network 51 is for example an IP network. In other words, for example, the part of the first network 51 which is outside of the house 1*h*, that is, the part that is outside beyond the router 1*t*, may be the Internet.

In addition, the via-LAN command receiving unit 61 receives a command using the first communication.

Figure 3:
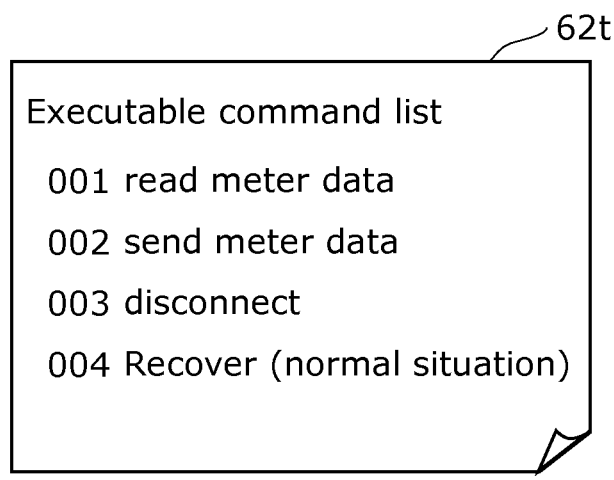
FIG. 3 is a diagram showing a list of commands.

FIG. 3 is a diagram showing a list 62*t* of commands that are received by the via-LAN command receiving unit 61.

It should be noted that, as shown in the field "003" in FIG. 3, the RD command 1*c* (FIG. 1) described earlier is, for example, received by the via-LAN command receiving unit 61.

The via-LAN command executing unit 62 executes commands (the RD command 1*c* and the like) received by the via-LAN command receiving unit 61.

The power source switching unit 67 causes the supply of power to be stopped (see Sa2 in FIG. 8, Sm11 in FIG. 10, and so on, described later) when the RD command 1*c* is received.

It should be noted that the power source switching unit 67 may be, for example, a switch, and the like, which switches state from a first state to a second state.

Specifically, for example, the first state is a state in which the power grid 9*a* and the power distribution board 1*b* are connected and the supply of power to the electrical device group 3*m* is performed.

The second state is a state in which such connection is not made and the supplying is not performed.

Specifically, the power source switching unit 67 may switch its state from the first state to the second state to stop the supply of power when the RD command 1*c* is received.

It should be noted that the power source switching unit 67 may be controlled to perform such operation.

Specifically, for example, such control may be performed by the NW-and-power source switching control unit 65.

It should be noted that this control, for example, may be performed by a control unit, and the like, provided inside of the power source switching unit 67.

For example, with this, the supply of power may be stopped simply, and without the need for service staff to go to the house 1*h*.

In addition, aside from the case where the received RD command 1*c* is not an unauthorized RD command 1*c*, It is also possible to have the case where it is an unauthorized RD command is (see aforementioned NPL 1, and so on).

Specifically, an RD command 1*c* that is not unauthorized is, for example, the RD command 1*c* transmitted by the first server 41 of the power company described earlier.

On the other hand, an unauthorized RD command 1*c* is an RD command 1*c*, and so on, transmitted by a third-party computer 1Q (FIG. 1) of a hacker, and the like.

Specifically, as a stoppage of the supply of power, aside from stoppage that is not unauthorized and caused by an RD command 1*c* that is not unauthorized, it is also possible to have an unauthorized stoppage due to an unauthorized RD command 1*c*.

In addition, it is assumed that, even after an unauthorized RD command 1*c* is received, it is necessary for communication to be performed by the smart meter 1 (see step Sa4 in FIG. 8, step Sa5 in FIG. 9 which are to be described later, and so on).

Specifically, such communication is, for example, as described in detail later, communication involved in processing (for example, investigation/restoration processing, processing to avoid unauthorized stoppage, and so on) for avoiding adverse effects (significant adverse effects) caused by receiving the unauthorized RD command 1*c*, and so on.

The via-Local command receiving unit 68 performs a second communication (communication using a second communication unit in FIG. 4 described later) performed through the second network 52 (FIG. 1).

The second communication is communication that is relatively difficult for the third-party computer 1Q of a hacker and the like to be connected to perform unauthorized communication.

Specifically, the second communication (communication by the second communication unit 122) is communication that is not as susceptible to use in unauthorized communication as the above-described first communication (communication by the first communication unit 121).

Here, unauthorized communication is, for example, communication in which an unauthorized packet is sent, or a DoS attack communication, and so on, from the third-party computer 1Q, and so on.

Specifically, for example, the first communication may be communication that is not communication with a predetermined device (see for example, the television 31, the registered device 1*r* in FIG. 11), and the second communication may be communication with a predetermined device.

It should be noted that, for example, authentication by the predetermined device (the television 31) may be unnecessary when the first communication is performed, whereas communication by such device may be necessary when the second communication is performed.

Specifically, attacking through the first communication may be performed even when it is not a case where the third-party computer 1Q wrongfully receives authentication from the predetermined device, whereas the attacking through the second communication may be performed in the case where wrongful authentication is received from the device.

Specifically, an attack through the second communication occurs only in a case where wrongful authentication is received from the device (television 31), and thus the second communication may be relatively less susceptible to use in an attack.

It should be noted that the second communication may be communication that is mediated by a predetermined device (television 31, and so on), that is, communication that passes through such device.

Moreover, the aforementioned predetermined device is, for example, a device (registered device 1*r* in FIG. 11) that is identified by predetermined data (for example, "ID001" which is the ID of the television 31 in FIG. 1).

It should be noted that such data is, for example, a registered device list 8*d*1 in FIG. 1 described later (see "001" in the registered device list 8*d*1 in FIG. 11).

Moreover, for example, as shown in the registered device list 8*d*1 in FIG. 11, each of plural predetermined devices (device denoted by "001" and device denoted by "005" in the registered device list 8*d*1 in FIG. 11) may be identified by the predetermined data, and the communication with each of such predetermined devices may be carried out using the second communication.

In addition, the registered device list 8d1 may be stored in a predetermined registration unit (for example, the via-Local command receiving unit 68 and the like are acceptable), and device registration into the registration unit may be performed (see registered device 1r in FIG. 11).

It should be noted that, for example, a personal computer and the like does not operate when power is turned OFF.

In contrast, even when power is turned OFF, household appliances such as a television, and so on, perform operations using what is called standby power, such as detecting the presence of commands from a remote control.

Specifically, a predetermined device may be the television 31 as described above.

In addition, the operation performed by the television 31 and the like when power is turned OFF may include operations such as processing of second communication with the smart meter 1 performed by the television 31 and the like.

With this, even when the power of the predetermined device (television 31) is turned OFF, second communication is possible, and second communication can be performed reliably.

It should be noted that the second communication may be implemented using a public phone network.

Specifically, for example, a subscriber identity module (SIM) card provided in mobile phones and the like may be provided in the smart meter 1, and the function of the second communication may be realized using software-implemented SIM, and so on.

In addition, the second communication may be performed using the SIM card or software SIM that is provided.

The NW switching unit 66 causes the performance of the above described first communication (Sx2) before the RD command 1c is received (see No in Sx3 in FIG. 5 described later).

Then, the NW switching unit 66 causes the performance of the above described second communication (Sx5) after the RD command 1c is received (see Yes in Sx3).

It should be noted that the NW switching unit 66 may be controlled to perform such operation.

Specifically, for example, such control may be performed by the NW-and-power source switching control unit 65.

It should be noted that this control, for example, may be performed by a control unit, and the like, provided inside the NW switching unit 66.

It should be noted that not allowing first communication refers to, for example, blocking (the communication path of) the first communication.

Furthermore, not allowing first communication may, for example, refer to causing the stoppage of the first communication.

It should be noted that, aside from the first communication, second communication may also be performed before the RD command 1c is received.

Figure 5:
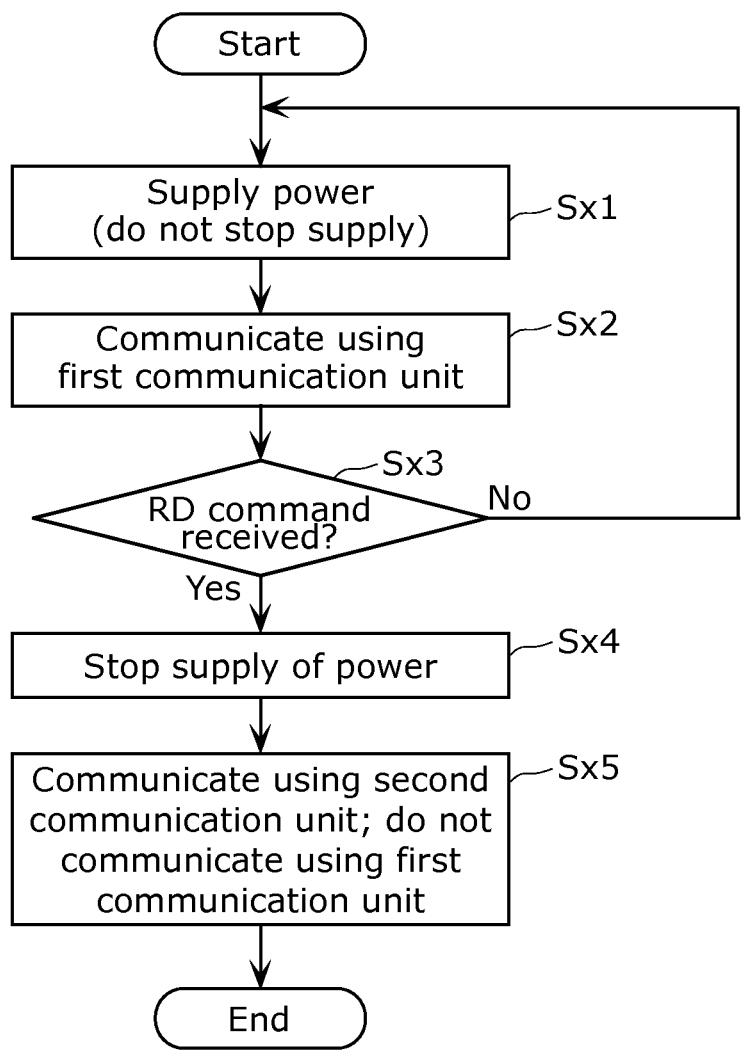
FIG. 5 is a flowchart of an operation of the smart meter.

With this, it is possible to avoid a secondary attack carried out through the performance of a first communication, which is susceptible to use in unauthorized communication, after an (unauthorized) RD command 1c is received (Yes in Sx3 in FIG. 5).

Specifically, after the RD command 1c is received (Yes in Sx3 in FIG. 5), the second communication (Sx5), which is not susceptible to use in unauthorized communication, is performed, and thus secondary attack can be prevented.

By extension, this prevents appropriate operations (Sa2 to Sa4 in FIG. 8, Sa5 to Sa7 in FIG. 9 described later) from failing due to a secondary attack, and thus the appropriate operations can be performed reliably after the RD command 1c is received.

Figure 4:
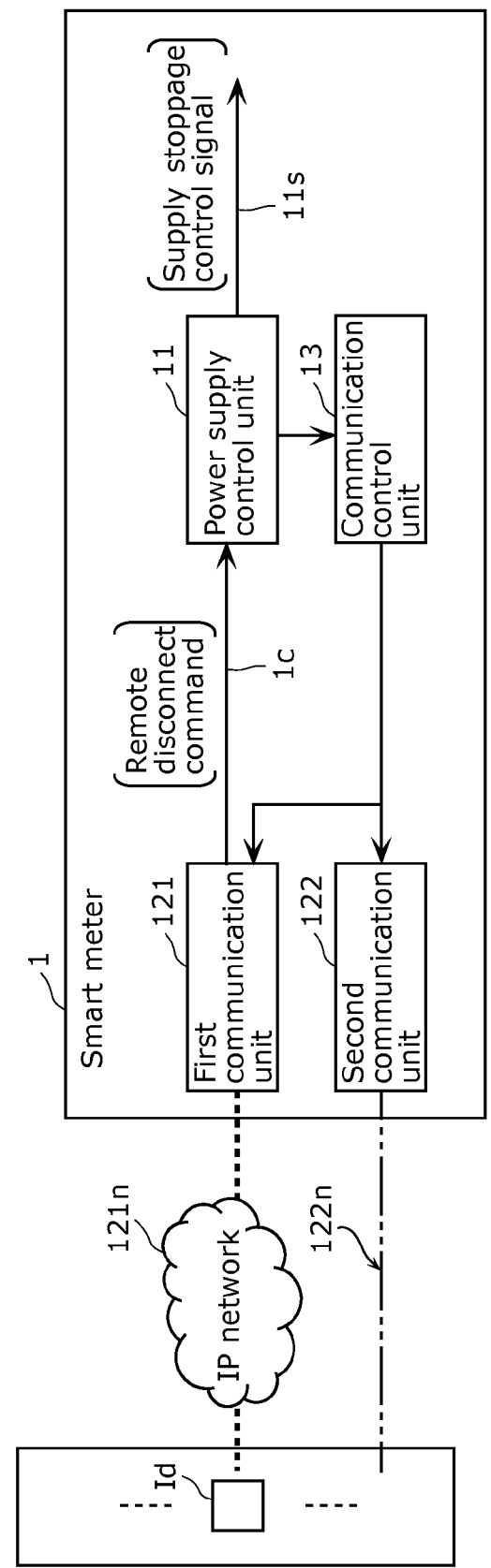

FIG. 4 is a diagram showing the smart meter 1, and so on.

It should be noted that descriptions of figures other than FIG. 4 (FIG. 2, and so on) should also be referred to, as necessary, for details of respective function blocks, such as the first communication unit 121, in FIG. 4.

FIG. 5 shows a flowchart for the smart meter 1.

It should be noted that the subsequent operation may, for example, be performed in the manner indicated below.

In step Sx1, supply of the power of the power grid 9a is performed.

In step Sx2, a first communication (first communication unit 121, via-LAN command receiving unit 61) is performed.

In step Sx3, it is judged whether or not an RD command 1c is received.

When it is judged that an RD command 1c has not been received (No in Sx3), the supply of power (Sx1) is performed and the first communication (Sx2) is also performed in a subsequent time after the time at which Sx3 is performed.

Specifically, for example, in this case (No in Sx3), control for causing the supply of power and so on (Sx1, Sx2) to continue may be performed.

In step Sx4, the supply of power from the power grid 9a is stopped when it is judged that an RD command 1c is received (Yes in Sx3).

In step Sx5, a second communication (second communication unit 122, via-Local command receiving unit 68) is performed.

It should be noted that, for example, the RD command 1c may be received in Sx2.

In this manner, the first communication unit 121 in FIG. 4 is described as follows.

Figure 8:
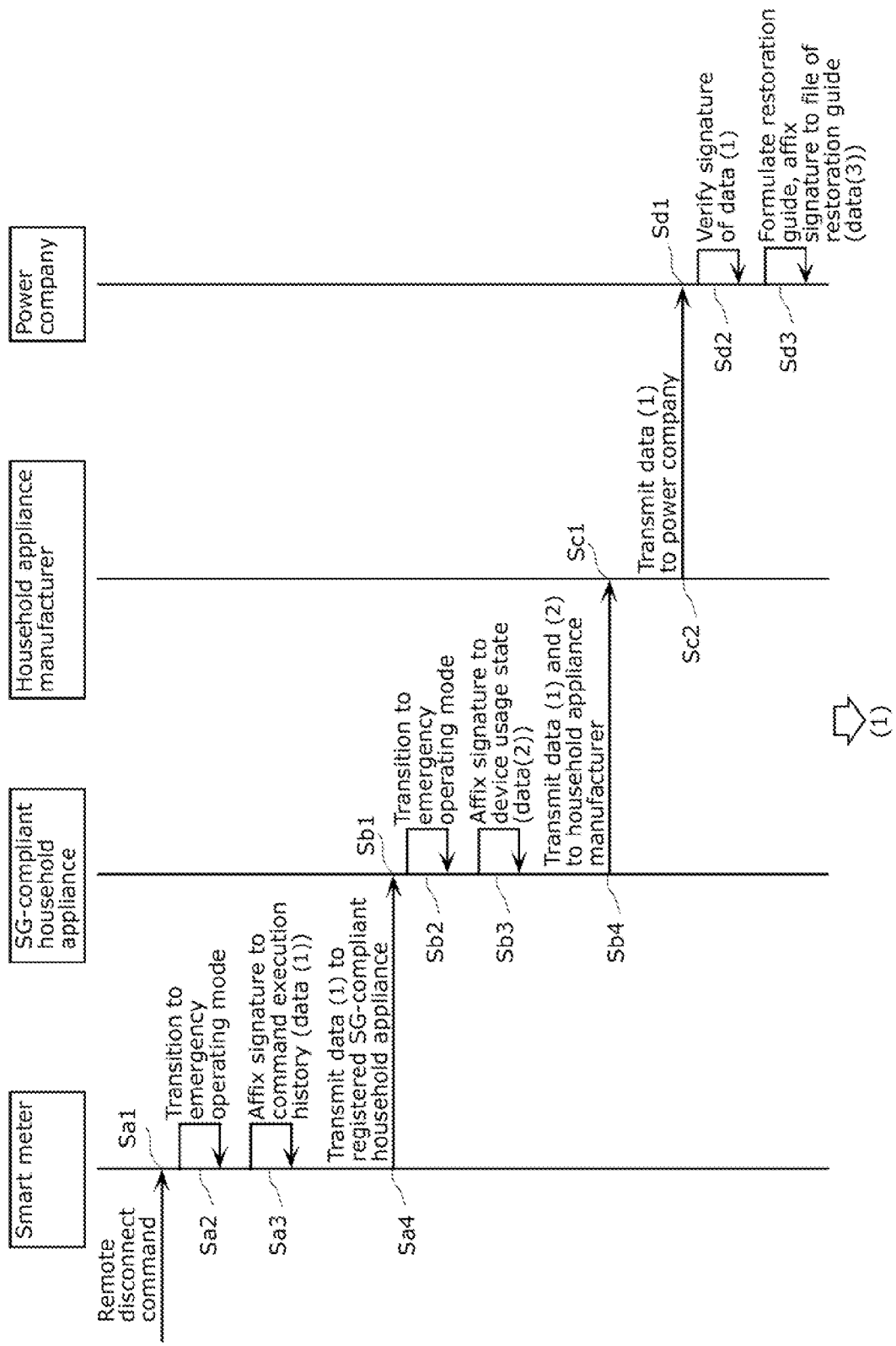
FIG. 8 is a diagram showing the first half of the flow of operations.
Figure 10:
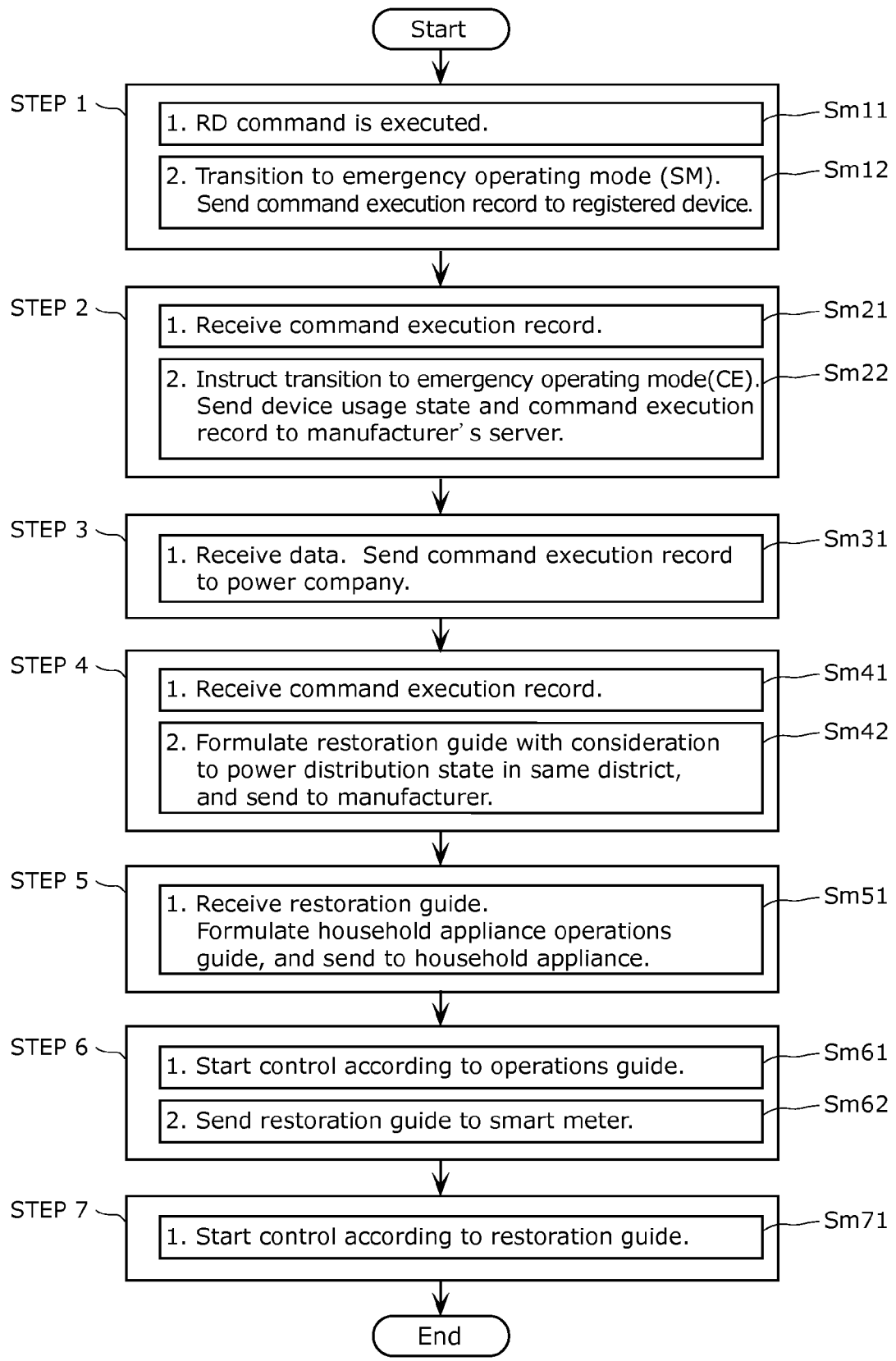
FIG. 10 is a flowchart showing the operations in a system.

Specifically, for example, when a power supply control unit 11 (the power source switching unit 67 and the NW-and-power source control unit 65, or only the power source switching unit 67, and so on) receives an RD command 1c to stop the supply of power passing through the smart meter 1 to an electrical device (television 31, and so on) (Yes in Sx3, Sa1 in FIG. 8 described later, Sm11 in FIG. 10 described later), the power supply control unit 11 causes the supply to be stopped (Sx4, Sa2 in FIG. 8, Sm12 in FIG. 10).

In addition, each of the first and second communication units (communication interfaces) 121 and 122 which perform communication are provided (the via-LAN command receiving unit 61 and the via-Local command receiving unit 68).

In addition, there is also a communication control unit 13 (the NW-and-power source switching control unit 65 and the NW switching unit 66, or only the NW switching unit 66, and so on).

The communication control unit 13 may cause first communication by the first communication unit 121 to be performed before an RD command 1c is received (No in Sx3), and, after the RD command 1c is received (Yes in Sx3, Sa1), causes only second communication (Sx5, Sa4, Sa5, Sm12, Sm62) by the second communication unit 122 to be performed without causing the performance of the first communication that was performed before the reception.

With this, it is possible to avoid a secondary attack, and appropriate operation can be carried out reliably after the stop command is received.

It should be noted that, for example, the via-LAN command receiving unit 61 in FIG. 2 is part of the first communication unit 121 in FIG. 4. Moreover, the function block of the via-Local command receiving unit 68, and so on, in FIG.

2 may, in the same manner as this example, be, for example, part of the function block in FIG. 4 corresponding to such function block.

It should be noted that the following technique is also possible as a sub-idea.

Specifically, for example, the process in Sx4 may be executed after the process in Sx5.

Figure 9:
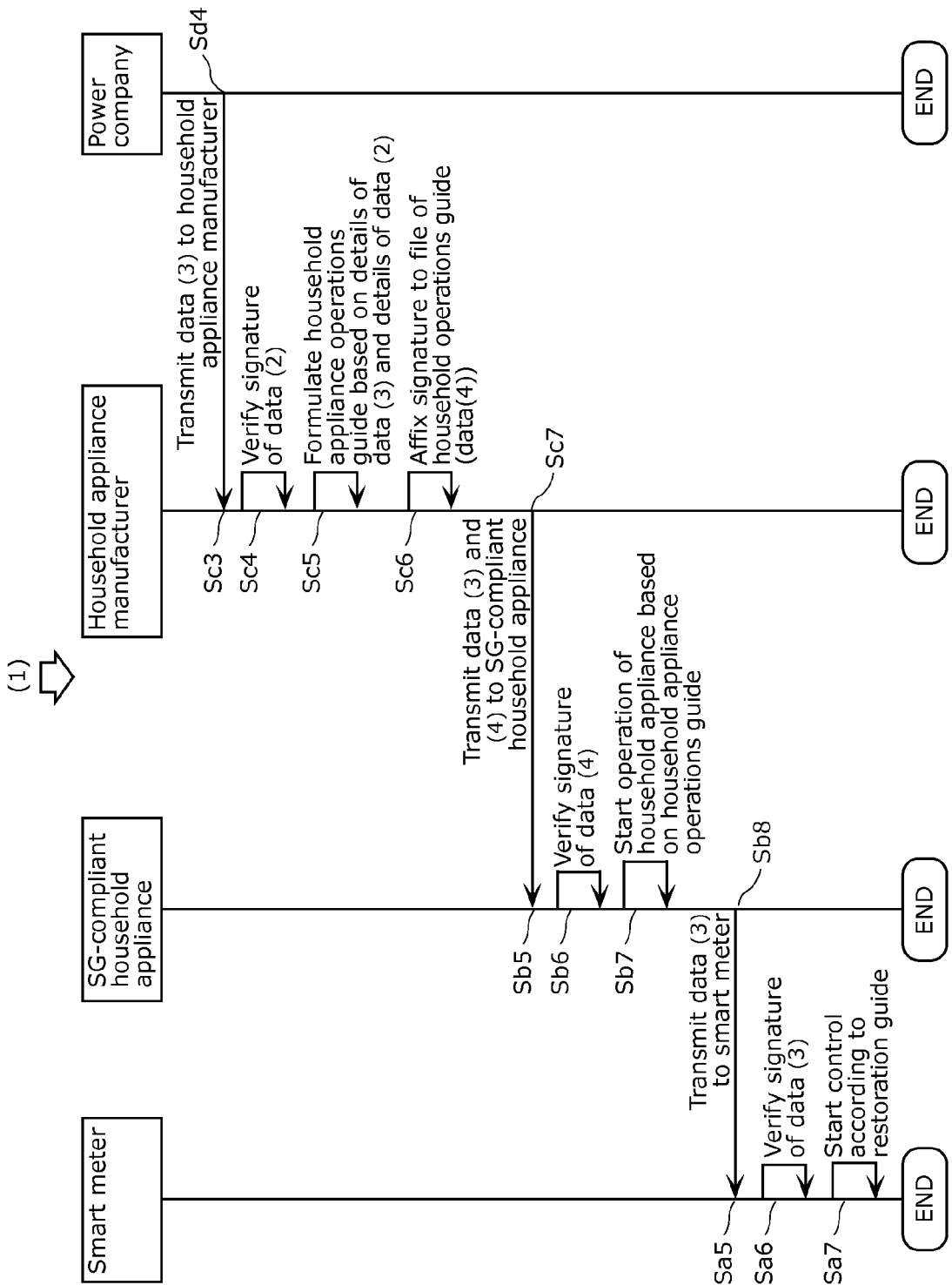
FIG. 9 is a diagram showing the second half of the flow of operations.

More specifically, for example, it is acceptable that, upon receiving the RD command 1c (Yes in Sx39), the smart meter 1 does immediately not cause the stoppage of the supply of power from the power grid 9s (Sx4), and obtains information from (the first server 41 of) the power company and so on, by second communication (Sx5) via a smart grid (SG)-compliant household appliance (registered device 1r), prior to causing the stoppage (Sx4) (see Sa5 and so on in FIG. 9).

Specifically, the information to be obtained is, for example, information indicating whether or not the received RD command 1c is a command transmitted by the first server 41 of the power company (i.e., a correct RD command 1c).

Then, when the obtained (Sx5) information does not indicate a command from the first server 41, stoppage of the supply need not be performed.

In addition, in only the case where the obtained (Sx5) information indicates a command from the first server 41, stoppage (Sx4) of the supply may be performed after the aforementioned second communication (Sx5).

It should be noted that, in this manner, the situation may be checked through the obtainment of information.

Then, the supply from the power grid 9a may be stopped (Sx4) after such checking (Sx5).

For example, in this manner, unauthorized power supply stoppage caused by an unauthorized RD command 1c can be prevented.

With this, it is possible to prevent an unauthorized stoppage caused by an unauthorized RD command 1c, at a house that does not have unpaid fees.

By extension, this makes it possible to avoid unauthorized stoppage in plural houses in the district in which the house 1h is located, and prevent an instance in which an unauthorized RD command 1c is transmitted simultaneously to such houses, unauthorized stoppage is performed simultaneously in the respective houses, and the power grid 9a goes down. Specifically, the smart meter provided in each of the houses may have a configuration that is the same as the configuration of the above-described smart meter 1 of the house 1h.

Accordingly, it is possible to prevent the power grid 9a from going into a downed state, and the power grid 9a can be reliably kept in an appropriate state.

(Storage Battery 1a)

It should be noted that the aforementioned registered device 1r (FIG. 11) is, for example, an electrical device, such as the television 31 and the like, to which the power from the power grid 9a is supplied.

The registered device 1r operates under the power from the power grid 9a (Sx1) which is supplied through the smart meter 1 in the case where the RD command 1c is not received (No in Sx3) (see "power distribution grid" in mode 1, in row 2, column 5 in FIG. 6 described later).

Then, when the RD command 1c is received (Yes in Sx3), the supply of power from the power grid 9a is stopped.

Here, for example, when the RD command 1c is received (Yes in Sx3), the registered device 1r may operate under power other than the power from the power grid 9a (for example, power from the storage battery 1a) (see "storage battery" in column 5 of mode 2).

In other words, the registered device 1r may perform the above-described processing for the second communication through such an operation under other power (power of the storage battery 1a).

As described above, such other power is power from the storage battery 1a (FIG. 1) and the like.

It should be noted that, as shown in FIG. 1, the storage battery 1a is a storage battery provided in the house 1h.

Specifically, for example, the power source switching unit 67 may prohibit the supply of power from the power grid 9a to the registered device 1r, when the RD command 1c is received (Yes in Sx3).

In addition, when the RD command 1c is received (Yes in Sx3), the power source switching unit 67 (FIG. 2) may cause the other power (power of the storage battery 1a) to be supplied to the registered device 1r in place of power from the power grid 9a.

It should be noted that the control for causing such an operation may be performed by the NW-and-power source switching control unit 65.

It should be noted that, as described later, even when the RD command 1c is received (Yes in Sx3), the operation of the smart meter 1 may be performed, not under the power from the storage battery 1a, but under the power from the power grid 9a (see "power distribution grid" in mode 2 in row 3, column 4 in FIG. 6).

(Plural Modes)

FIG. 6 is a diagram showing a table for four modes.

It should be noted that, for example, the smart meter 1 may operate in a mode selected from plural modes (modes 1 to 4). Moreover, such selection may be performed, for example, by the power supply control unit 11 (FIG. 4).

Specifically, for example, operation in mode 1 (row 2 in FIG. 6) may be performed before the RD command 1c is received (No in Sx3).

Then, for example, operation in a mode included in modes 2 to 4 (rows 3 to 5 in FIG. 6) may be performed after the RD command 1c is received (Yes in Sx3).

Specifically, for example, operation in mode 2 (row 3) may be performed immediately after mode 1 ends.

Specifically, in mode 2, blocking of communication (see "not possible" in row 3, column 3) and so on may be performed.

In addition, as indicated by "storage battery" (row 3, column 5) in column 5 labeled "power transmission to device", in mode 2, the operation of the registered device 1r may be performed under the power of the storage battery 1a (see previous description).

Specifically, for example, in mode 2, the operation of the respective electrical devices may be performed under the power of the storage battery 1a.

It should be noted that, in mode 2, the power from the power grid 9a may be supplied to an electrical device when a predetermined condition is satisfied, and so on.

Specifically, this condition may be, for example, a condition that such electrical device is the refrigerator 32, and so on.

With this, cooling under relatively large power consumption may be performed, and damage to refrigerated food items, and the like, may be avoided.

In addition, after such an operation in mode 2 is performed, operation in mode 4 may be performed.

Specifically, as indicated by "power distribution network" (row 5, column 5) in column 5 labeled "power transmission to device", in mode 4, the operation of the registered device 1r may be performed under the power from the power grid 9 (see previous description).

Specifically, for example, in mode 4, the operation of the respective electrical devices may be performed under the power from the power grid 9a.

With this, the inconvenient time in which supply of power is limited to only that from the storage battery is can be minimized.

In addition, after such an operation in mode 4 is performed, operation in mode 1 may be performed again.

It should be noted that, after the RD command 1c is received, operation in mode 3 may be performed in the period that is not the period in which the operation in mode 4 is performed.

Specifically, for example, as indicated by "possible" in row 4, column 3, in mode 3, first communication may be performed regardless of whether it is after the RD command 1c is received.

Then, for example, as indicated by "storage battery" in row 4, column 4, in mode 3, the smart meter 1 may also operate under the power of the storage battery 1a instead of operating under the power from the power grid 9a.

It should be noted that, for example, operation may be performed only in modes 1, 2, and 4, without performing such an operation in mode 3.

FIG. 7 is a diagram showing a table 65t.

In the table 65t, row 2 indicates whether or not power from the power grid 9a is to be supplied, and row 3 indicates whether or not first communication is to be performed.

Table 65t is to be referred to as necessary.

(Communication of a Record 8d2, and so on)

As described above, when the RD command 1c is received (Yes in Sx3), second communication (communication using the second communication unit 122) is performed.

Here, the following processes may be performed.

Specifically, as described earlier, the smart meter 1 is included in the system 1s (FIG. 1).

In addition, for example, the first server 41 of the power company, in the server system 4 (FIG. 1), may transmit an RD command 1c.

Then, the second server 42 of the manufacturer may receive the transmitted RD command 1c, and transmit the received RD command 1c to the smart meter 1 using first communication via the Internet (first network 51).

FIG. 8 is a diagram showing the first half of the flow of operations in the system 1s. It should be noted FIG. 9 showing the second half shall be described in detail later.

FIG. 10 is a flowchart showing the operations in the system 1s.

Then, the smart meter 1 receives the RD command 1c transmitted by the second server 42 (Sa1, Sm11, Sx2, Yes in Sx3 in FIG. 5).

Then, when the RD command 1c is received (Sa1, Yes in Sx3), the supply of power may be stopped and the first communication may be blocked (Sa2, Sm12, Sx4, Sx5).

FIG. 11 is a diagram showing the smart meter 1, the registered device 1r, the server system 4, and so on.

Then, when the RD command 1c is received (Sa1, Yes in Sx3), second communication is performed between the smart meter 1 and the registered device 1r (television 31, and the like).

Specifically, a record 8d2 (FIG. 11) of the operation of the smart meter 1 may be transmitted using such second communication (command execution record transmitting unit 64a in FIG. 2, Sa4, Sm12).

It should be noted that the record 8d2 to be transmitted may be information (record of commands) and the like identifying respective commands executed by the smart meter 1 before the RD command 1c is received.

Specifically, the record 8d2 may be stored in the smart meter 1 (record storage unit 64 in FIG. 2), and the stored record 8d2 may be transmitted to the registered device 1r.

It should be noted that, the record storage unit 64 may be, for example, a storage device having what is called tamper-resistance, and the like, such that the stored record 8d2 is relatively insusceptible to unauthorized reading.

It should be noted that a signature 8d3 (FIG. 11) of the record 8d2 may be generated by the smart meter 1 (Sa3, Sm12).

Then, the signature 8d3 of the record 8d2 may be transmitted by the smart meter 1, together with the record 8d2, to the registered device 1r.

In addition, verification of the transmitted signature 8d3 may be performed in the server system 4, and so on (Sd2 in FIG. 8), and operation based on the record 8d2 may be performed when such verification is successful.

It should be noted that, in the same manner, signatures (signatures 8d6, 8d8, 8d10, and so on) may also be generated (Sb3, Sd3, Sc6) for data (device information 8d5, data 8d7 and 8d9, and so on) other than the record 8d2, and transmitting, receiving, verification (Sd2, Sc4, Sb6, Sa6) and so on, of the generated signatures may also be carried out, as shown in FIG. 11.

Then, the transmitted record 8d2 is received by the registered device 1r (Sb1, Sm21).

Then, the received record 8d2 is transmitted from the registered device 1r to the second server 42 of the manufacturer (Sb4, Sm22).

It should be noted that, for example, aside from the record 8d2, device information 8d5 (FIG. 11) indicating the power consumption of an electrical device (the registered device 1r, and the like) may also be transmitted (Sb4, Sm22).

Moreover, either or both the device information 8d5 of the power consumption of the registered device 1r and the device information 8d5 of other electrical devices (refrigerator 32, and the like, in FIG. 1) may be transmitted.

In this manner, for example, by transmitting one or more device information 8d5, device group information 8d4 (FIG. 11) composed of the device information of the respective electrical devices may be obtained in the server system 4.

It should be noted that the electrical device (for example, the registered device, and so on) may operate (Sb2) in an emergency operating mode (Sm22 in FIG. 10) when the record 8d2 is received (Sb1, Sm21).

It should be noted that, for example, the aforementioned emergency operating mode is a mode in which power consumed in such mode is relatively small.

With this, the depletion of the power of the storage battery is can be slowed down.

It should be noted that the receipt of the record 8d2 may be notified by receiving the record 8d2 as a notification indicating that the RD command 1c has been received.

In addition, in the server system 4, data (data 8d7, 8d9 (FIG. 11)) may be generated when the transmitted record 8d2 of the operation of the smart meter 2 is received (Sc1).

Specifically, each of the data 8d7, which is a restoration guide, and the data 8d9, which is an operations guide, may be generated in the server system 4.

Then, for example, the generated restoration guide data 8d7 may be, for example, control data, and the like, specifying an operation of the smart meter 1 and performing, on the smart meter 1, control for causing such operation.

Specifically, the operation may be instructed through the data 8d7.

It should be noted that the data 8*d*7 may also be data specifying a mode (see FIG. 6) and causing the operation in the specified mode.

In addition, the generated operations guide data 8*d*9 may be, for example, data specifying an operation of the registered device 1*r* and instructing the registered device 1*r* to perform such operation.

In addition, the operation of the devices other than the registered device 1*r* may be instructed through the operations guide data 8*d*9.

It should be noted that the data 8*d*9 may also be data specifying a mode and causing the operation in the specified mode.

It should be noted that, as described in detail later, the data 8*d*7, which is a restoration guide for the operation of the smart meter 1, may be generated by the first server 41 of the power company (Sd3, Sm42).

In addition, the data 8*d*9 which is an operations guide for the operation of the registered device 1*r*, may be generated by the second server 42 of the manufacturer (Sc5, Sm51).

Specifically, the record 8*d*2 and so on of the operation of the smart meter 1 transmitted by the registered device 1*r* is received by the second server 42 of the manufacturer in the server system 4 (Sc1, Sm31).

Then, the received record 8*d*2, and so on, is transmitted to the first server 41 of the electric company (Sc2, Sm31).

Then, the above-described restoration guide data 8*d*7 (FIG. 11) is generated by the first server 41 from a part or the entirety of the received record 8*d*2, and so on.

FIG. 9 is a diagram showing the second half portion of the operations in the system 1*s*.

Then, for example, the generated data 8*d*7 is transmitted to the second server 42 of the manufacturer (Sd4, Sm42).

Then, the transmitted data 8*d*7 is received by the second server 42 of the manufacturer (Sc3, Sm51).

Then, the operations guide data 8*d*9 is generated by the second server 42 of the manufacturer (Sc5, Sm51).

Specifically, such generation is performed using on one or both of the received record 8*d*2 and so on (Sc1) and the received operations guide data 8*d*7 (Sc3).

In addition, the restoration guide data 8*d*7 (Sc3) received from the first server 41 of the power company and the generated operations guide data 8*d*9 (Sc5) are each transmitted to the registered device 1*r* (Sc7, Sm51).

Then, the registered device 1*r* receives the transmitted data 8*d*7 and 8*d*9 (Sb5, Sm61).

Then, the operation specified by the received operations guide data 8*d*9 is performed by the registered device 1*r* (Sb7, Sm61).

Then, the received restoration guide data 8*d*7 is transmitted to the smart meter 1 (Sb8, Sm62).

Then, transmitted restoration guide data 8*d*7 is received (Sa5, Sm71, Sx5), and the operation specified by the received data 8*d*7 is performed by the smart meter 1 (Sa7, Sm71).

In this manner, for example, the following operation may be performed.

Specifically, the system 1*s* may include: the smart meter 1; the registered device 1*r* (for example, the television 31) to which power from the power grid 9*a* is supplied via the smart meter 1; and the server system 4.

In addition, when an RD command 1*c* to stop power supply which is transmitted by the server system 4 through the first communication unit 121 is received by the power supply control unit 11 (FIG. 4) (Sa1, Yes in Sx3), the power supply control unit 11 may stop the supply of power (Sa2, Sx4).

In addition, when the RD command 1*c* to stop power supply is received (Sa1, Yes in Sx3), the smart meter 1 may transmit, to a predetermined electrical device (registered device 1*r*, television 31), a record 8*d*2 of the operation of the smart meter 1, through a second communication by the second communication unit 122 (command execution record transmitting unit 64*a*, Sa4, Sx5).

Then, the registered device 1*r* (television 31) may transmit the transmitted record 8*d*2 to the server system 4 (first server 41 of the manufacturer) (Sb4).

Then, the server system 4 (first server 41) may transmit, to the registered device 1*r*, each of restoration guide data 8*d*7, which is first data specifying an operation of the smart meter 1, and operations guide data 8*d*9, which is second data specifying an operation of the registered device 1*r* (electrical device) (Sc7).

Then, the registered device 1*r* may perform the operation specified by the transmitted second data (data 8*d*9) and transmit, to the smart meter 1, the transmitted first data (data 8*d*7).

Then, the smart meter 1 may perform the operation specified by the transmitted first data (data 8*d*7).

(Firmware, and so on)

More specifically, for example, the following operations may be performed.

Figure 12A:
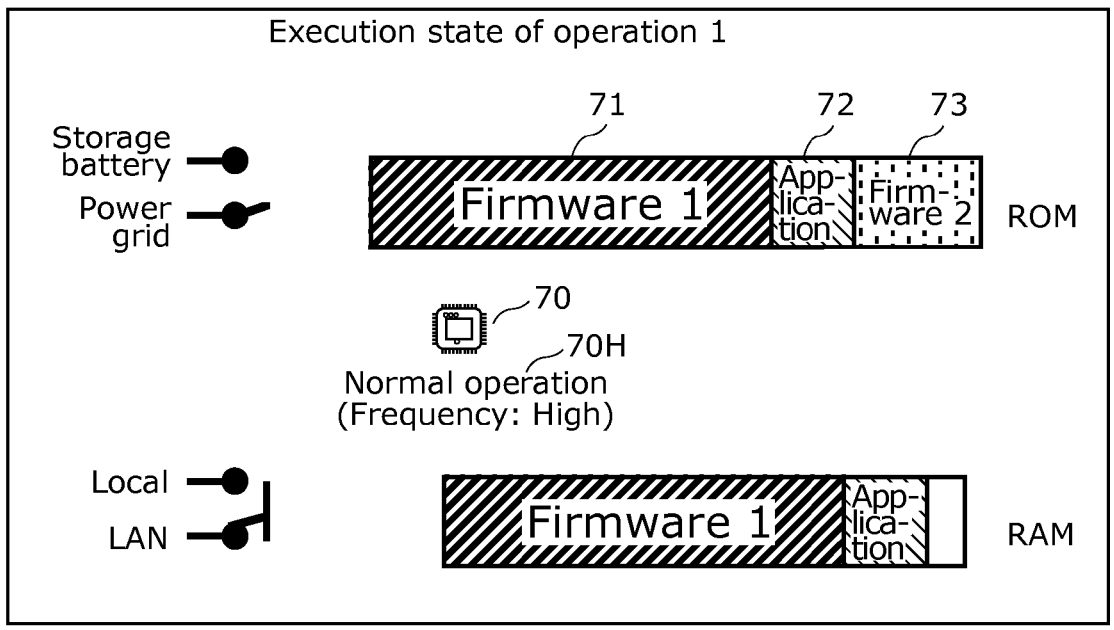
FIG. 12A is diagram showing a CPU and so on in mode 1.

FIG. 12A is a diagram showing a RAM, and so on, in an operation in mode 1 (FIG. 6).

Figure 12B:
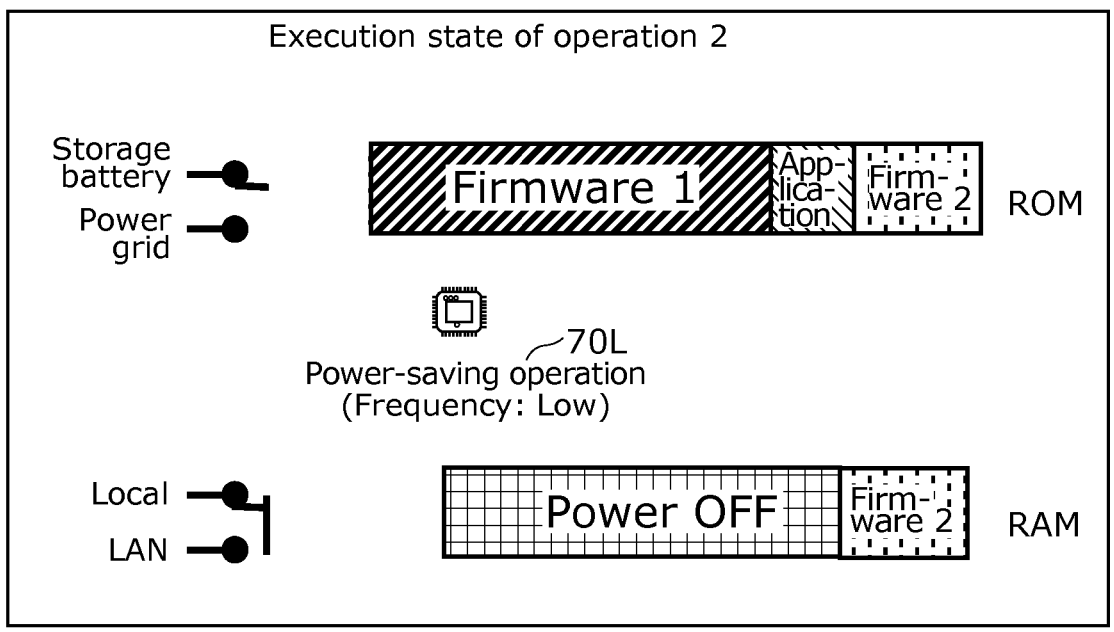
FIG. 12B is diagram showing the CPU and so on in mode 2.

FIG. 12B is a diagram showing a RAM, and so on, in an operation in mode 2.

Figure 12C:
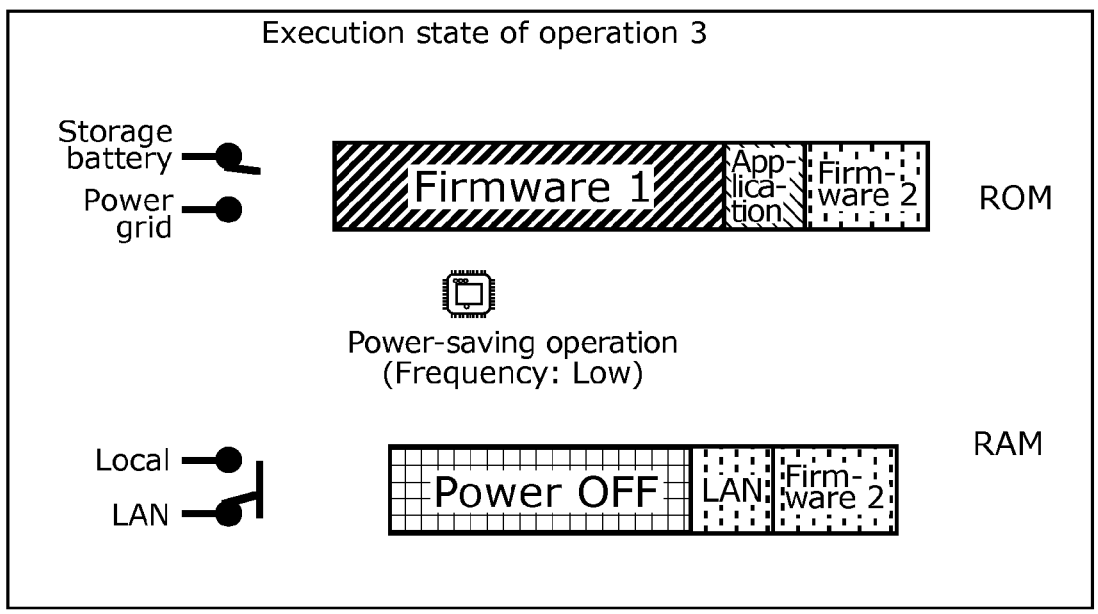
FIG. 12C is a diagram showing the CPU and so on in mode 3.

FIG. 12C is a diagram showing a RAM, and so on, in an operation in mode 3.

Figure 12D:
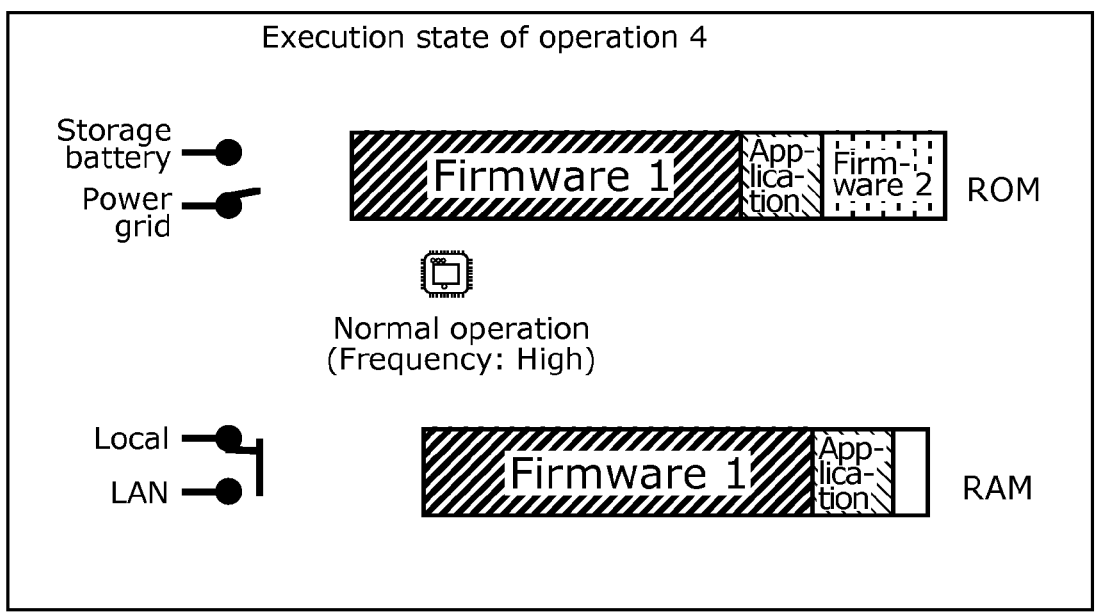
FIG. 12D is diagram showing the CPU and so on in mode 4.

FIG. 12D is a diagram showing a RAM, and so on, in an operation in mode 4.

Specifically, for example, together with the execution of a first firmware 71 (see FIG. 12A, and so on), a second firmware 73 may also be executed by a central processing unit (CPU) 70. Detailed description of the CPU 70 shall be provided later.

In addition, for example, the first firmware 71 may be executed in each of the cases shown in FIG. 12A (operation 1) and FIG. 12D (operation 4).

On the other hand, the second firmware 73 may be executed in each of the cases shown in FIG. 12B (operation 2) and FIG. 12C (operation 3).

In addition, for example, as indicated by the width of the program of the respective firmware shown in the figure, the size of the second firmware 73 is smaller than the size of the first firmware 71.

Specifically, for example, the second firmware 73 does not include the portion for the processing of the first communication, and therefore has a relatively small size.

Accordingly, in the execution of the second firmware 73, power consumption is reduced and the resources to be used are reduced.

Furthermore, due to its small size, vulnerability (risk) with the second firmware 73 is relatively low (problems which may cause risks are few). Accordingly, when the second firmware 73 is executed, safer operation is performed.

It should be noted that, for example, the vulnerability with the second firmware 73 may be low since its size is small, functions to be realized are few, functions to be realized are not prone to include security holes, and so on.

As such, when the second firmware 73 is executed, memory conservation (see random access memory (RAM) in FIG. 12B and FIG. 12C), low resource use, and low risk are realized.

It should be noted that, as indicated by "storage battery" and "power grid" on the upper left end of FIG. 12A and FIG. 12D, for example, the power to be supplied in each of operations 1 and 4 is the power from the power grid 9*a* (see modes 1 and 4 in FIG. 6).

In addition, as indicated by "storage battery" and "power grid" in FIG. 12B and FIG. 12D, the power supplied in each of the operations 2 and 3 is the power of the storage battery 1*a* (see modes 2 and 3).

Furthermore, as indicated by "Local" and "LAN" on the lower left end of FIG. 12A and FIG. 12C, first communication is performed in each of operations 1 and 3 (see modes 1 and 3 in FIG. 6).

In addition, first communication is not performed in each of operations 2 and 4 (see modes 2 and 4).

Specifically, for example, the CPU 70 is a CPU provided in the smart meter 1. It should be noted that the CPU 70 may be a CPU provided in the registered device 1*r*.

Specifically, when the RD command 1*c* is received by a device such as the smart meter 1 and power of the storage battery 1*a* is supplied to such device, operation having relatively low power consumption may be performed (FIG. 12B, FIG. 12C).

It should be noted that, for example, as described above, when the smart meter 1 is performing an operation in mode 3 (see FIG. 12C, and so on) and an operation under the power of the storage battery 1*a* is to be performed, an operation using relatively small power consumption may be performed.

In this manner, for example, it is acceptable to use devices (smart meter 1, television 31, and so on) which operate on the first firmware 71 before the RD command 1*c* to stop power supply is received (FIG. 12A) and operate on the second firmware 73 after the RD command 1*c* is received (FIG. 12B, FIG. 12C).

It should be noted that the smart meter 1, and so on, may exceptionally operate on the first firmware 71 when an operation under the power of the power grid 9*a* is to be performed in such device even after the RD command 1*c* is received.

It should be noted that operation at a relatively high frequency (normal operation 70H in FIG. 12A) may be performed in the case of FIG. 12A and FIG. 12D, whereas operation at a relatively low frequency (power-saving operation 70L) may be performed in the case of FIG. 12B and FIG. 12C.

Accordingly, power consumption can be more sufficiently reduced in the case of FIG. 12B and FIG. 12C.

Specifically, for example, it is acceptable to use devices (smart meter 1, television 31, and so on) which operate at a relatively high frequency before the RD command 1*c* to stop power supply is received (FIG. 12A) and operate at a relatively low frequency after the RD command 1*c* is received (FIG. 12B, FIG. 12C).

It should be noted that, for example, from among modes 1 to 4 in FIG. 6, the mode in which the smart meter 1 is operating may be detected by the registered device 1*r* using second communication, and so on.

Then, when mode 1 is detected, the operation 1 in the case of FIG. 12A may be performed, and so on.

Figure 13A:
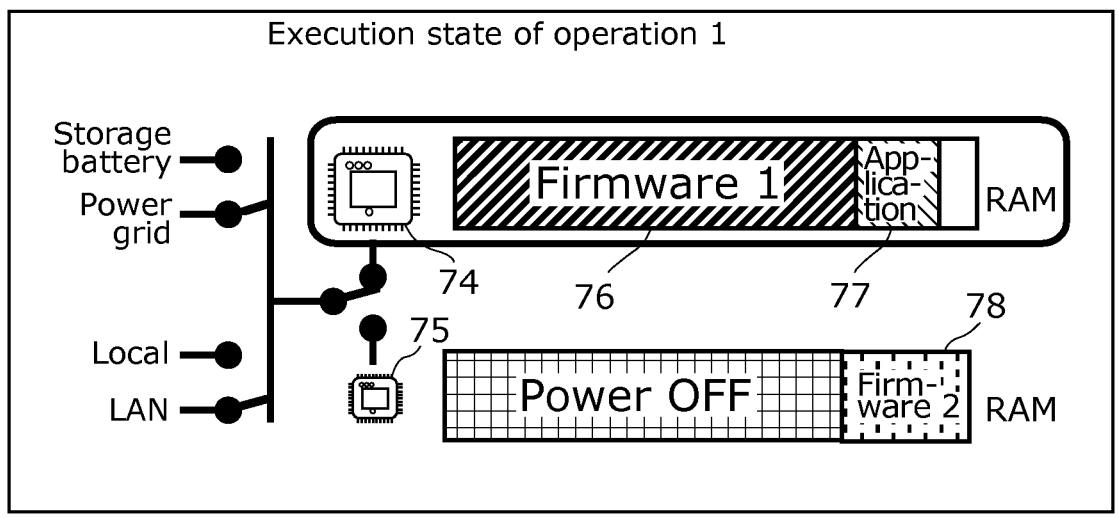
FIG. 13A is a diagram showing first and second CPUs and so on in mode 1.

FIG. 13A is a diagram showing a RAM, and so on, in an operation in mode 1.

Figure 13B:
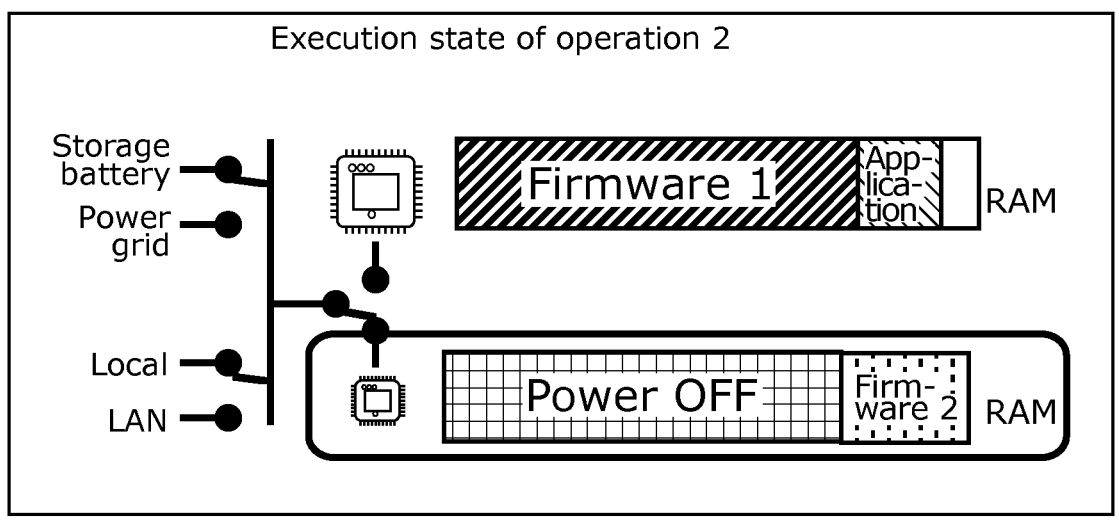
FIG. 13B is a diagram showing the first and second CPUs and so on in mode 2.

FIG. 13B is a diagram showing a RAM, and so on, in an operation in mode 2.

Figure 13C:
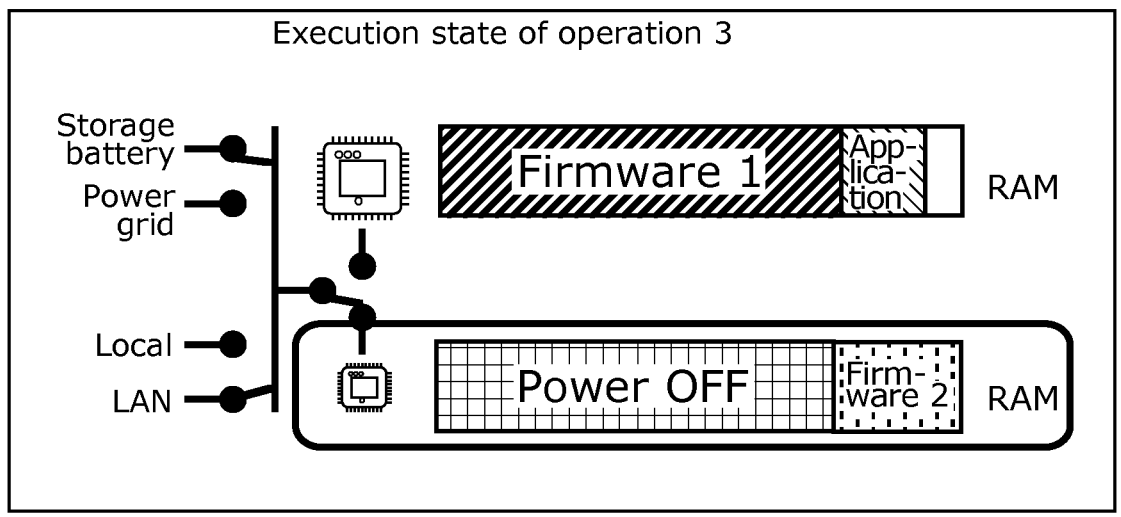
FIG. 13C is a diagram showing the first and second CPUs and so on in mode 3.

FIG. 13C is a diagram showing a RAM, and so on, in an operation in mode 3.

Figure 13D:
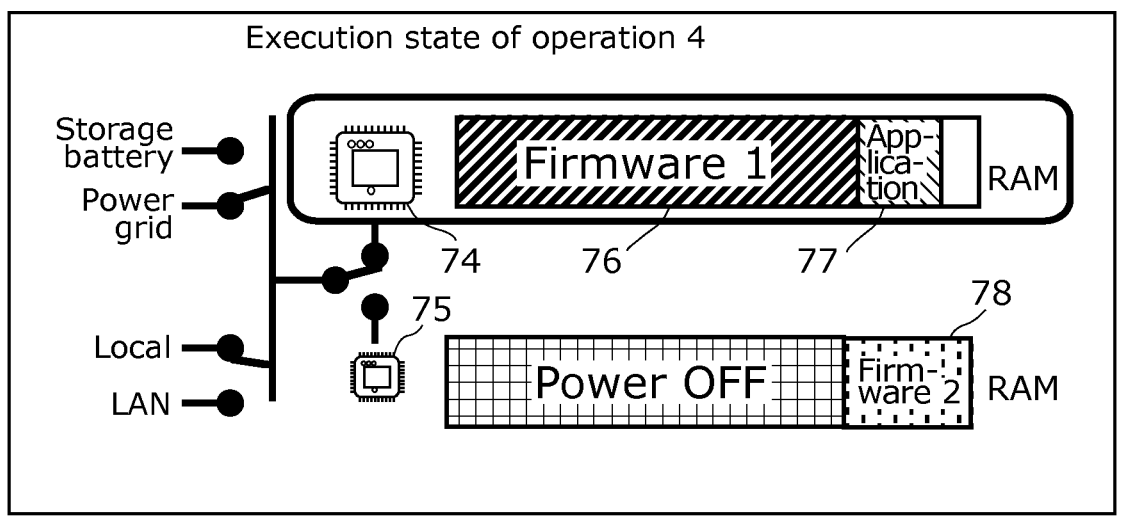
FIG. 13D is a diagram showing the first and second CPUs and so on in mode 4.

FIG. 13D is a diagram showing a RAM, and so on, in an operation in mode 4.

Specifically, for example, two CPUs such as a first CPU 74 and a second CPU 75 (FIG. 13A, and so on) may be provided instead of having only the single CPU 70 (FIG. 12A, and so on).

Specifically, processing may be executed by the first CPU 74 when a first firmware 76 is executed, and processing may be executed by the second CPU 75 when a second firmware 78 is executed. It should be noted that, for example, the first and second CPUs 74 and 75 are provided in the smart meter 1.

In addition, as schematically indicated by the illustrated sizes of the first and second CPUs 74 and 75, for example, the power consumption of the second CPU 75 when performing program execution may be less than the power consumption of the first CPU 74 when performing program execution of the same program.

Accordingly, power consumption when the second firmware 78 is executed can be further reduced.

In this manner, for example, devices (smart meter 1, television 31, and so on) are configured in which processing is executed using the first CPU 74 before the RD command 1*c* to stop power supply is received (FIG. 13A) and processing is executed using the second CPU 75 after the RD command 1*c* is received (FIG. 13B, FIG. 13C).

It should be noted that the second firmware 78 may be firmware having lower vulnerability (problems which may cause risks are fewer) than the first firmware 76, and so on.

(Others)

Figure 14:
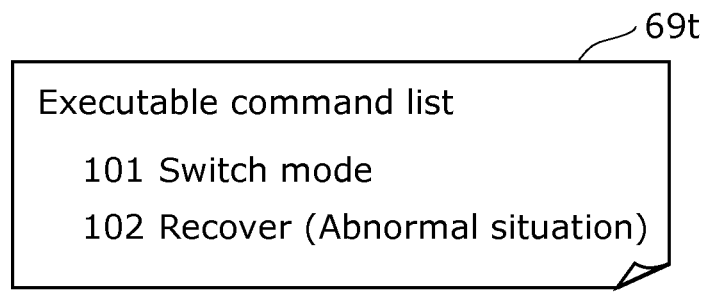
FIG. 14 is a diagram showing a list of commands.

FIG. 14 is a diagram showing a list 69*t* of commands received through second communication.

For example, each of the commands in the list 69*t* may be received through second communication.

In addition, the received command may be executed by the via-Local command execution unit 69 (FIG. 2).

It should be noted that the receiving of a command through second communication such as that described above, for example, may also be performed before the RD command 1*c* is received or may be performed only after the RD command 1*c* is received.

In addition, for example, the types of commands in the list 69*t* may be restrictive and fewer than the types of commands in the list 62*t* in FIG. 3.

Specifically, for example, a command for remote meter reading need not be receivable through second communication.

Furthermore, for example, a command for network blocking (for example, the RD command 1*c*) need not be receivable through second communication.

It should be noted that coordination between the smart meter 1 and a household electrical appliance (television 31, and so on) in this manner allows investigation into the reasons for the occurrence of trouble (for example, unauthorized stoppage of power supply caused by an unauthorized RD command 1*c*), restoration, and so on (see FIG. 8, FIG. 9, and so on).

In other words, the following operations may be performed by the smart meter.

When trouble occurs, the operating mode transitions from a normal (remote command-receivable) mode (mode 1) to an emergency (interaction only with internal registered devices; electrical devices are storage battery-driven) mode (mode 2, and so on).

In addition, the command execution record (record 8*d*2) is safely held (record storage unit 64). Then, the held command execution record is safely transmitted to the first server 41 of the power company via a household appliance (television 31) when trouble occurs. Then, the transmitted command execution record is used as a lead for distinguishing between an attack by a hacker, and the like, and an actual mishap.

Furthermore, the following operations are performed by a smart grid (SG)-compatible household appliance (television 31, and so on).

Specifically, operation as an intermediary for sending the command execution record of the smart meter 1 to the first server 41 of the power company is performed (see Sb1, Sb4 in FIG. 8).

Furthermore, operation as an intermediary for sending, from the first server 41 of the power company to the smart meter 1, the restoration guide to the smart meter and the operations guide (data 8*d*7 and 8*d*9) is performed (see Sb5 and Sb8 in FIG. 9).

It should be noted that the electrical devices such as the television 31 and so on may transition from the normal operating mode to a power-interruption mode (a mode which allows rapid shutdown of storage devices for data that may be lost).

It should be noted that, as described earlier, the receipt of the RD command 1*c* may be notified to the registered device 1*r* by way of transmission of the record 8*d*2.

Furthermore, in the first server 41 of the power company, a restoration guide (data 8*d*7) is formulated based on the command execution record (record 8*d*2) and sent to the smart meter 1 via the television 31.

It should be noted that the transmission of an unauthorized RD command 1*c* described above may be what is called a cyber attack and the like.

The following operations may be performed in the server system 4 (for example, the first server 41 of the power company).

Specifically, judgment for whether or not the RD command 1*c* received by the smart meter 1 is an unauthorized RD command 1*c* may be performed.

It should be noted that, for example, this judgment may be performed by judging whether or not the identification number, and the like, of the RD command 1*c* received by the smart meter 1 is the same as the identification number of the RD command 1*c* transmitted by the first server 41.

Then, when it is judged to be an unauthorized command, a subsequent judgment may be performed by the first server 41 of the power company.

Specifically, judgment may be performed for whether or not the same phenomenon (a greater number of incidences than a threshold) is occurring in other houses in the district (same district) in which the house 1*h* provided with the smart meter 1 is located.

Specifically, judgment may be performed for whether the phenomenon is not occurring and there is no anomaly in (the power distribution network such as) the power grid 9*a*, or the phenomenon is occurring and there is an anomaly.

Then, when it is judged that there is no anomaly and it is judged that the root of the problem is relatively shallow, the following operations may be performed.

Specifically, in such case, the restoration guide data 8*d*7, which instructs operation in a recovery mode (mode 4) may be generated and transmitted to the smart meter 1.

A predetermined process for verifying that there is no anomaly in the power distribution network may be performed, and the aforementioned generating and transmitting, and so on, may be performed only when it is verified through such processing that there is no anomaly.

It should be noted that when it is judged that there is no anomaly in the same district, such fact may be notified to the second server 42 of the manufacturer from the first server 41 of the power company.

Then, when such notification is carried out, the second server 42 of the manufacturer may issue, to the television 31, and so on, an instruction for causing operation in a predetermined recovery mode (see operations guide data 8*d*9 and so on).

On the other hand, when the same phenomenon is occurring in the same district, it is judged that there is an anomaly in the power grid 9*a*, and it is judged that the root of the problem is deep, the following operations may be performed.

Specifically, in this case, it is assumed that it will take a relatively long time for the investigation/restoration of the power distribution network (power grid 9*a*), the investigation as to the cause of the RD command 1*c* execution, and so on.

In view of this, in this case, the first server 41 of the power company may transmit a planned restoration date (to the smart meter 1, and so on) (see restoration guide data 8*d*7).

It should be noted that the planned restoration date to be transmitted may specify a specific planned restoration date and so on.

It should be noted that it is acceptable to instruct (see restoration guide data 8*d*7 and so on), by sending the planned restoration date in this manner, that the emergency mode (see mode 2 in FIG. 6 and so on) be maintained up to the sent planned restoration date.

It should be noted that, in such a case where investigation of the cause, and so on, will take a long time, the second server 42 of the manufacturer may issue an instruction to cause the performance of power-saving control such as control to cause only the refrigerator to operate (see operations instruction data 8*d*9).

Moreover, for example, control for reducing power consumption further as the planned restoration date is far, may be performed by the refrigerator 32 and so on.

Whether or not to send such a power-saving instruction may be determined by the second server 42 of the manufacturer, and so on, in view of the planned restoration date, the amount of stored power of the storage battery 1*a*, the device usage state (the device group information 8*d*4 in FIG. 11, and so on), and so on.

It should be noted that, in this manner, operation in plural operating modes (FIG. 6) is performed. Accordingly, it possible to carry out flexible operation management according to circumstances such as whether an attack via a network is a prank or terrorism, while also realizing the conventional non-payment countermeasures.

Figure 15:
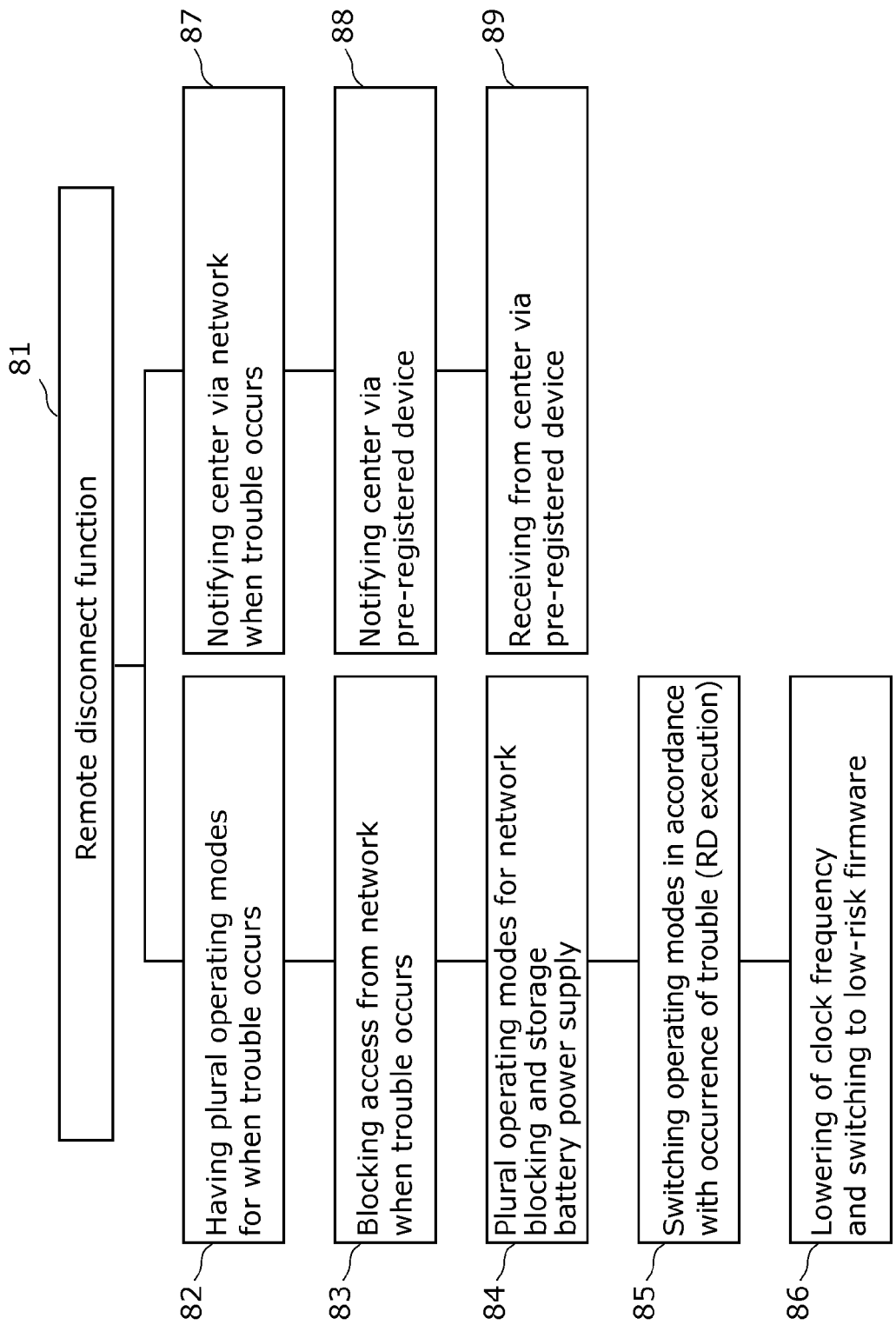
FIG. 15 is a diagram showing respective functions.

FIG. 15 is a diagram showing plural functions (function 81 to function 89).

Refer also to FIG. 15 as necessary to understand the functions of the smart meter 1 described above. The smart meter 1 may, for example, have the function blocks for the respective functions of function 81 to function 89 in FIG. 15.

It should be noted that, for example, a smart meter which only has the function blocks within a range 1*j* in FIG. 2 is assumed as a smart meter in which the present technique is not utilized.

As described above, the smart meter 1 is superior to such assumed smart meter.

It should be noted that the following cases are acceptable.

The address of the smart meter 1 in a first communication using the first communication unit 121 may be a first address, and the address of the smart meter 1 in a second communication using the second communication unit 122 may be a second address.

For example, with this, the address of the smart meter 1 when communication is performed may be switched by the smart meter 1 between the first address and the second address.

It should be noted that a media access control (MAC) address is available as an address.

For example, communication using a first MAC address may be performed in a first communication, and communication using a second MAC address may be performed in a second communication.

For example, the first communication unit 121 may be a first communication device which performs communication using the first MAC address, and the second communication unit 122 may be a second communication device which performs communication using the second MAC address.

It should be noted that each of the communication devices may be, for example, what is called a communication card.

It should be noted that first communication may be communication through a first communication path, and second communication may be communication through a second communication path that is different from the first communication path.

Figure 16:
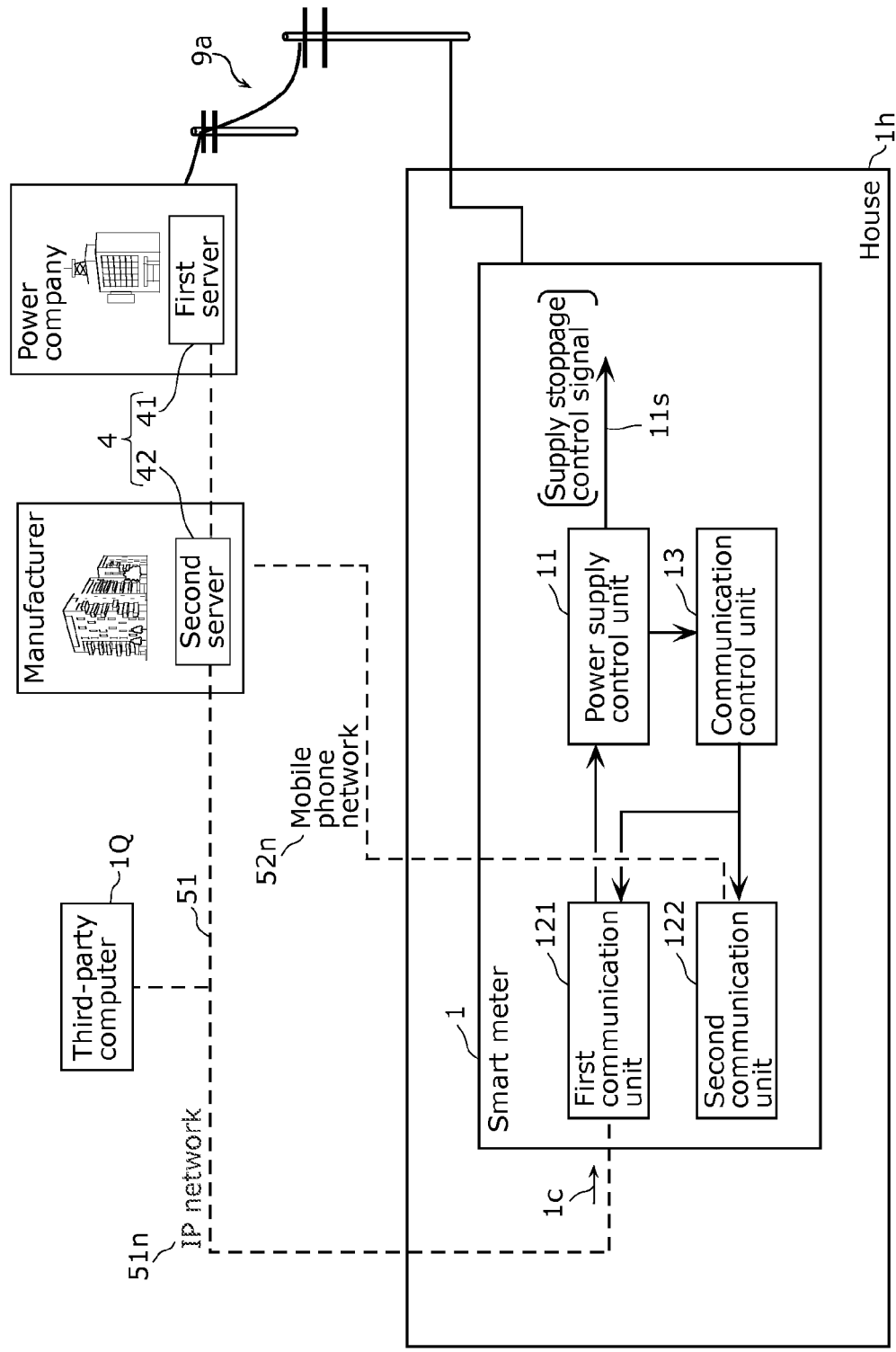
FIG. 16 is a diagram showing a configuration of a smart meter.

FIG. 16 is a diagram showing a configuration of the smart meter 1, and so on.

It should be noted that first communication may be communication through a first communication network (first network) 51n, and second communication may be communication through a second communication network (second network) 52n that is different from the first communication network 51n.

For example, the first communication network 51n may be the IP network shown in FIG. 16, whereas the second communication network 52n may be a mobile phone network.

In this manner, for example, the second communication network 52n may be a mobile phone network, and communication through the second communication network 52n may be relatively insusceptible to attack by a hacker and the like.

It should be noted that at least part of the first communication network 51n may be the Internet.

Moreover, the second communication network 52n may be a Worldwide Interoperability for Microwave access (WiMAX) communication network instead of a mobile phone network.

It should be noted that the first address in a first communication (described earlier) may be an address in the first communication network 51n, and the second address in a second communication (described earlier) may be an address in the second communication network 52n.

In the same manner, the first communication path (described earlier) may be a communication path passing through the first communication network 51n, and the second communication path (described earlier) may be a communication path passing through the second communication network 52n.

Furthermore, the first communication device (described earlier) may be a communication device that performs communication in the first communication network 51n, and the second communication device (described earlier) may be a communication device that performs communication in the second communication network 52n.

For example, the first communication device may be what is called a Network Interface Card (NIC) or a Wireless Network Interface Card (WNIC), and the like, whereas the second communication device may be a communication device that performs wireless communication using a mobile phone.

It should be noted that, as described earlier, a Subscriber Identity Module (SIM) card may be provided to the smart meter 1.

Moreover, in this manner, an operation may be performed by the smart meter 1.

This operation, for example, is an operation executed by a CPU provided in the smart meter 1.

This operation, for example, includes an operation performed by the power supply control unit 11 and an operation performed by the communication control unit 13, but does not include an operation performed by the first communication unit 121 and an operation performed by the second communication unit 122.

As a clock frequency of the CPU executing this operation, there may be a first frequency (see FIG. 12A and so on) and a second frequency (see FIG. 12B) that is lower than the first frequency.

The first firmware 71 and the second firmware 73 may be provided as firmware to be executed by the CPU when this operation is performed.

As CPUs which execute this operation, the first CPU 74 and the second CPU 75 may be provided in the smart meter 1.

In addition, as the operation, there may be a first operation before the RD command 1c is received and a second operation after the command is received.

The first operation may be performed at the first frequency, and the second operation may be performed at the second frequency. Furthermore, the first operation may be performed on the first firmware 71, and the second operation may be performed on the second firmware 73. Furthermore, the first operation may be performed using the first CPU 74, and the second operation may be performed using the second CPU 75.

In this manner, the present technique allows combining of plural constituent elements (for example, see the power supply control unit 11 and the communication control unit 13 in FIG. 4, and so on), and thus a synergetic effect is produced from such combination. In contrast, the prior art lacks all or part of these constituent element, and thus the synergistic effect is not produced. The present technique differs from and is superior to the prior art in this point.

It should be noted that the present invention can be implemented, not only as a device, a system, and so on, but also as: a method having steps corresponding to the processing units included in such device; a program causing a computer to execute such steps; a computer-readable recording medium, such as a CD-ROM, on which such program is recorded; and information, data, or a signal representing such program. Moreover, such program, information, data and signal may be distributed via a communication network such as the Internet.

It should be noted that the present invention is not limited to the above-described embodiments. Various modifications to the present embodiments that can be conceived by those skilled in the art, and forms configured by combining constituent elements in different embodiments without departing from the teachings of the present invention are included in the scope of the present invention.

It is possible to prevent a secondary attack after an unauthorized RD command is received. Accordingly, it is possible to provide a smart meter that can perform appropriate operations without secondary attacks, after an unauthorized RD command is received.

REFERENCE SIGNS LIST

1 Smart meter
1c RD command
1r Registered device
1s System
1Q Third-party computer
4 Server system
9a Power grid
11 Power supply control unit
11s Supply stoppage control signal 13 Communication control unit
31 Television
41 First server
42 Second server
51n First communication network
52n Second communication network
67 Power source switching unit
121 First communication unit
121n, 51 First network
122 Second communication unit
122n, 52 Second network

The invention claimed is:

1. A smart meter comprising:
a power supply control unit configured to control stoppage of a supply of power passing through the smart meter to an electrical device when a command to stop the supply is received;
a first communication unit configured to perform a first communication and to receive the command;
a second communication unit configured to perform a second communication; and
a communication control unit configured to:
control the performance of the first communication until the command is received by the first communication unit; and
prohibit the performance of the first communication and control the performance of only the second communication, after the command is received by the first communication unit,
wherein the first communication unit is configured to perform communication that does not pass through a predetermined device,
the second communication unit is configured to perform communication which passes through the predetermined device,
the predetermined device is the electrical device to which the power from a power grid is supplied, and
the power supply control unit is configured to prohibit the supply of the power from the power grid to the predetermined device and control power from a predetermined storage battery to be supplied to the predetermined device, after the command is received by the first communication unit.

2. The smart meter according to claim 1,
wherein the first communication unit is configured to perform communication through a first communication network, and
the second communication unit is configured to perform communication through a second communication network different from the first communication network.

3. The smart meter according to claim 2,
wherein the second communication network is a mobile phone network.

4. The smart meter according to claim 1,
wherein the smart meter:
operates in one of a plurality of modes including a first mode and a second mode; and
operates in the first mode when the command is not received, and operates in the second mode upon receiving the command, and
the communication control unit is configured to:
control the performance of the first communication during operation in the first mode; and
prohibit the performance of the first communication and control the performance of only the second communication, during operation in the second mode.

5. The smart meter according to claim 4,
wherein, during operation in the second mode, the power supply control unit is configured to control stoppage of only the supply of the power from a power grid to the electrical device, out of the smart meter and the electrical device, and
the smart meter operates under the power from the power grid even during operation in the second mode.

6. The smart meter according to claim 4,
wherein the smart meter:
operates in a third mode when not operating in the second mode, when the command is received; and
operates under power from a predetermined storage battery and not under the power from the power grid, during operation in the third mode, and
the communication control unit is configured to control the performance of the first communication during operation in the third mode.

7. The smart meter according to claim 4,
wherein, when the command is received, the smart meter operates in a fourth mode after operating in the second mode,
the second communication is communication which passes through the electrical device, and
the power supply control unit is configured to:
control power from a predetermined storage battery to be supplied to the electrical device during operation in the second mode; and
control the power from a power grid to be supplied to the electrical device during operation in the fourth mode.

8. The smart meter according to claim 1, comprising
a record transmitting unit configured to transmit, using the second communication, a record of an operation of the smart meter to the predetermined device after the command is received, the operation being an operation of the smart meter before the command is received.

9. The smart meter according to claim 8,
wherein the second communication unit is configured to receive, from the predetermined device to which the record is transmitted, data specifying an operation of the smart meter, and
the smart meter performs the operation specified by the data, when the data is received.

10. The smart meter according to claim 1,
wherein the smart meter operates at a first frequency before the command is received, and operates at a second frequency lower than the first frequency after the command is received.

11. The smart meter according to claim 1,
wherein the smart meter operates on first firmware before the command is received, and operates on second firmware after the command is received.

12. The smart meter according to claim 1,
wherein the smart meter operates under a first CPU before the command is received, and operates under a second CPU after the command is received.

13. A system comprising:
the smart meter according to claim 1;
an electrical device; and
a server,
wherein the smart meter:
receives the command from the server, using the first communication; and
includes a record transmitting unit configured to transmit, using the second communication, a record of an operation of the smart meter to the electrical device, when the command is received, the electrical device transmits the transmitted record to the server, the server transmits, to the electrical device, first data and second data which are generated from the transmitted record, the first data specifying an operation of the smart meter, and the second data specifying an operation of the electrical device, and the electrical device performs the operation specified by the transmitted second data, and transmits the transmitted first data to the smart meter, and the smart meter performs the operation specified by the transmitted first data.

14. An operating method executed in a system including the smart meter according to claim 1, an electrical device, and a server, the method comprising:

transmitting a record of an operation of the smart meter to the electrical device, when the command is received from the server through the first communication, the transmitting being performed by the smart meter using the second communication;

transmitting the transmitted record to the server, the transmitting being performed by the electrical device;

transmitting first data and second data which are generated from the transmitted record to the electrical device, the transmitting performed by the server, the first data specifying an operation of the smart meter, and the second data specifying an operation of the electrical device; and performing the operation specified by the transmitted second data and transmitting the transmitted first data to the smart meter, the performing and transmitting being performed by the electrical device; and performing the operation specified by the transmitted first data, the performing being performed by the smart meter.

15. A supply control method comprising:

controlling a supply of power passing through a smart meter to an electrical device to be stopped, when a command to stop the supply is received by a first communication unit that performs a first communication, the first communication unit and a second communication unit being included in the smart meter;

controlling the performance of the first communication until the command is received by the first communication unit; and prohibiting the performance of the first communication and controlling performance of only a second communication by the second communication unit, after the command is received by the first communication unit, wherein the first communication performs communication that does not pass through a predetermined device, the second communication performs communication that passes through the predetermined device, the predetermined device is the electrical device to which the power from a power grid is supplied, and the supplying of power prohibits the supply of the power from the power grid to the predetermined device and controls power from a predetermined storage battery to be supplied to the predetermined device, after the command is received by the first communication unit.

16. An integrated circuit comprising:

a power supply control unit configured to control a supply of power passing through a smart meter to an electrical device to be stopped, when a command to stop the supply is received by a first communication unit that performs a first communication, the first communication unit and a second communication unit being included in the smart meter; and a communication control unit configured to:

control the performance of the first communication until the command is received by the first communication unit; and prohibit the performance of the first communication and control performance of only a second communication by the second communication unit, after the command is received by the first communication unit, wherein the first communication unit is configured to perform communication that does not pass through a predetermined device, the second communication unit is configured to perform communication which passes through the predetermined device, the predetermined device is the electrical device to which the power from a power grid is supplied, and the power supply control unit is configured to prohibit the supply of the power from the power grid to the predetermined device and control power from a predetermined storage battery to be supplied to the predetermined device, after the command is received by the first communication unit.

17. A non-transitory computer-readable recording medium for use in a computer, the non-transitory computer-readable recording medium having a computer program recorded thereon for causing the computer to execute steps comprising:

controlling a supply of power passing through a smart meter to an electrical device to be stopped, when a command to stop the supply is received by a first communication unit that performs a first communication, the first communication unit and a second communication unit being included in the smart meter;

controlling the performance of the first communication until the command is received by the first communication unit; and prohibiting the performance of the first communication and causing performance of only a second communication by the second communication unit, after the command is received by the first communication unit, wherein the first communication performs communication that does not pass through a predetermined device, the second communication performs communication that passes through the predetermined device, the predetermined device is the electrical device to which the power from a power grid is supplied, and the supplying of power prohibits the supply of the power from the power grid to the predetermined device and controls power from a predetermined storage battery to be supplied to the predetermined device, after the command is received by the first communication unit.

* * * * *